(12) United States Patent
Hirano et al.

(10) Patent No.: US 8,804,219 B2
(45) Date of Patent: Aug. 12, 2014

(54) IMAGE PROCESSING APPARATUS, IMAGE PROCESSING METHOD, AND COMPUTER-READABLE RECORDING MEDIUM STORING IMAGE PROCESSING PROGRAM FOR COLOR CONVERSION OF IMAGE DATA

(75) Inventors: Masanori Hirano, Kanagawa (JP); Yoshihisa Ohta, Tokyo (JP); Masakazu Yoshida, Kanagawa (JP); Takashi Kimura, Kanagawa (JP); Takayuki Ito, Kanagawa (JP); Arata Yamaguchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 529 days.

(21) Appl. No.: 12/919,771
(22) PCT Filed: Feb. 26, 2009
(86) PCT No.: PCT/JP2009/054119
§ 371 (c)(1),
(2), (4) Date: Aug. 27, 2010
(87) PCT Pub. No.: WO2009/113437
PCT Pub. Date: Sep. 17, 2009

(65) Prior Publication Data
US 2011/0051208 A1    Mar. 3, 2011

(30) Foreign Application Priority Data
Mar. 10, 2008    (JP) .................................. 2008-059274

(51) Int. Cl.
G03F 3/08    (2006.01)
(52) U.S. Cl.
USPC ............. 358/520; 358/1.9; 358/518; 358/523
(58) Field of Classification Search
CPC .................................................... H04N 1/6019
USPC .................... 358/1.9, 518, 520, 523
See application file for complete search history.

(56) References Cited

U.S. PATENT DOCUMENTS 6,057,932 A      5/2000  Yoshida et al.
6,359,703 B1 *   3/2002  Yabe ............................. 358/1.9
(Continued)

FOREIGN PATENT DOCUMENTS

JP    9 216419      8/1997
JP    2004 80266    3/2004
(Continued)

OTHER PUBLICATIONS

The Extended European Search Report issued Apr. 12, 2012, in Application No. / Patent No. 09719321.3-2202 / 2250803 PCT/JP2009054119.

*Primary Examiner* — Benny Q Tieu
*Assistant Examiner* — Quyen V Ngo
(74) *Attorney, Agent, or Firm* — Oblon, Spivak, McClelland, Maier & Neustadt, L.L.P.

(57) ABSTRACT

An image processing apparatus is disclosed. The image processing apparatus includes a color conversion processing unit which obtains CMY data from input color space coordinate data of image data, and an output data generating unit which generates output data by forming CMYK data by using a result output from a color conversion processing section. The color conversion processing section includes an optimum color reproduction data structure which gives the CMY data for obtaining a full color image optimally reproduced from the input color space coordinate data, and a color material using amount reducing data structure for outputting the input color space coordinate data by reducing the color material using amount with the use of a reference value in which the color material using amount is increased for a hue of an output image giving a high psychological effect and is decreased for a hue of the output image giving a low psychological effect.

15 Claims, 19 Drawing Sheets

(56) References Cited

U.S. PATENT DOCUMENTS

| | | |
|---|---|---|
| 6,578,944 B1 | 6/2003 | Kamei et al. |
| 6,923,520 B2 | 8/2005 | Oikawa et al. |
| 7,023,584 B2 * | 4/2006 | Cowan et al. ............... 358/1.9 |
| 7,083,247 B2 | 8/2006 | Yoshida et al. |
| 7,102,791 B2 | 9/2006 | Hirano et al. |
| 7,210,757 B2 | 5/2007 | Hirano et al. |
| 7,407,248 B2 | 8/2008 | Hirano et al. |
| 7,481,510 B2 | 1/2009 | Hirano et al. |
| 7,499,198 B2 | 3/2009 | Hirano et al. |
| 7,527,351 B2 | 5/2009 | Hirano et al. |
| 7,533,961 B2 | 5/2009 | Kikuchi et al. |
| 7,576,886 B2 | 8/2009 | Kimura et al. |
| 7,600,842 B2 | 10/2009 | Hirano et al. |
| 7,701,612 B2 | 4/2010 | Ike et al. |
| 7,710,620 B2 | 5/2010 | Sakakibara et al. |
| 7,733,545 B2 | 6/2010 | Sakakibara et al. |
| 7,751,155 B2 | 7/2010 | Kimura et al. |
| 2004/0218221 A1 | 11/2004 | Hirano et al. |
| 2004/0223172 A1 * | 11/2004 | Yoshizawa et al. ............ 358/1.8 |
| 2006/0044616 A1 | 3/2006 | Satoh et al. |
| 2006/0098232 A1 | 5/2006 | Nakano et al. |
| 2007/0064031 A1 | 3/2007 | Nakano et al. |
| 2007/0091135 A1 | 4/2007 | Hosaka et al. |
| 2007/0206226 A1 | 9/2007 | Kimura et al. |
| 2007/0216953 A1 | 9/2007 | Kikuchi et al. |
| 2007/0279658 A1 | 12/2007 | Ito et al. |
| 2008/0117467 A1 | 5/2008 | Hosaka et al. |
| 2008/0137147 A1 | 6/2008 | Nakano et al. |
| 2009/0147327 A1 | 6/2009 | Murai et al. |

FOREIGN PATENT DOCUMENTS

| | | |
|---|---|---|
| JP | 2004 291267 | 10/2004 |
| JP | 2005 35012 | 2/2005 |
| JP | 2006 68982 | 3/2006 |
| JP | 2006 82251 | 3/2006 |
| JP | 2006 211161 | 8/2006 |
| JP | 2006 270927 | 10/2006 |
| JP | 3937977 | 6/2007 |
| JP | 2007 235661 | 9/2007 |
| JP | 2007 324900 | 12/2007 |
| WO | 03 043306 | 5/2003 |

\* cited by examiner

IMAGE PROCESSING APPARATUS, IMAGE PROCESSING METHOD, AND COMPUTER-READABLE RECORDING MEDIUM STORING IMAGE PROCESSING PROGRAM FOR COLOR CONVERSION OF IMAGE DATA

TECHNICAL FIELD

The present invention generally relates to an image processing apparatus, an image processing method, and a computer-readable recording medium storing an image processing program in which an image is formed by reducing a color region.

BACKGROUND ART

Recently, plural electrophotographic copying apparatuses and plural printers have been installed in one office corresponding to wide availability of personal computers. Therefore, when plural image processing apparatus are installed in an office, costs of the image processing apparatuses have been greatly studied in addition to the study of image quality of the image processing apparatuses.

When an image is formed, a monochrome image and a color image can be formed. When the monochrome image is formed, only one color material black (K) is required in either a laser scanning system or an inkjet system. On the other hand, when a color image is formed, generally, the color image is reproduced by using four color materials cyan (C), magenta (M), yellow (Y), and black (K) so that black reproducibility of the image is increased and amounts of the other color materials are reduced. In addition, when a user requests, five or more color materials including a special color material other than the CMYK materials are used.

When a color image is formed, not only may each color material be used alone, but also hue, luminance, and so on must be expressed by mixing the color materials by superposing different color material images. Therefore, in some cases, the cost of forming a color image is several times the cost of forming a monochrome image.

In order to decrease the cost of forming the color image, several studies have been performed. Generally, a color material using amount decreasing mode for decreasing a using amount of a color material, which is referred to as an econo-mode or an ink reducing mode, is installed in an image processing apparatus.

For example, in Patent Document 1, a thinning out process is applied to image data by using a specific pattern, and the actual using amount of color materials is decreased. In Patent Document 2, the number of tones is decreased from input data with a predetermined ratio, components at a shadow side using a large amount of the color materials are decreased, and the total amount of the color materials is decreased. In Patent Document 3, a CMM (color matching method) is used and the amount of the color material is finely adjusted.

The method, in which the amount of the color materials is decreased by using CMM, is described in Patent Documents 4, 5, and 6.

In Patent Documents 4 and 6, the amount of the color materials is decreased by using CMM. In Patent Document 5, a different tone process is applied to the color materials whose luminances are different from each other in highlight and shadow by using CMM. In Patent Documents 4 through 6, when the amount of the color materials is decreased, a color region to be reproduced by image forming is decreased; however, and minimizing degradation of the color reproducibility caused by the decrease of the color region is not an objective.

That is, in Patent Documents 1 through 6, the amount of the color material is decreased or the color reproducibility in highlight and shadow is increased by using CMM. The amount of the color material to be decreased while reproducing an image in high definition and minimizing the degradation of the image quality caused by the decrease of the color material are not described. Specifically, when the amount of the color material is decreased so as not be high cost, the reproduced image is blurred, and image impression and psychological effect to be originally obtained from the color image are decreased. Consequently, cost and image quality to be satisfied by a user cannot be obtained.

[Patent Document 1] Japanese Unexamined Patent Publication No. 2006-270927

[Patent Document 2] Japanese Unexamined Patent Publication No. H09-216419

[Patent Document 3] Japanese Unexamined Patent Publication No. 2004-80266

[Patent Document 4] Japanese Unexamined Patent Publication No. 2006-68982

[Patent Document 5] PCT International Patent Application No. WOA 2003-043306

[Patent Document 6] Japanese Unexamined Patent Publication No. 2007-235661

SUMMARY OF INVENTION

In an embodiment of the present invention, there is provided an image processing apparatus, an image processing method, and a computer-readable recording medium storing an image processing program in which an amount of a color material can be reduced while minimizing the psychological and physical influence on a user by the reduction of a color region caused by the reduction of the amount of the color material.

To achieve one or more of these and other advantages, according to one aspect of the present invention, there is provided an image processing apparatus which performs a color conversion of image data. The image processing apparatus includes an application unit which obtains the image data, a color conversion unit which obtains at least CMY data from input color space coordinates of input color space coordinate data of the image data, and an output data generating unit which generates output data by forming CMYK data with the use of an output result of the color conversion unit. The color conversion unit includes an optimum color reproduction data structure which obtains at least the CMY data for obtaining a full color image optimally reproduced from the input color space coordinate data, and a color material using amount reducing data structure which obtains at least the CMY data in which the color material using amount is increased from a reference value for a hue of an output image that gives a large psychological effect and the color material using amount is decreased from the reference value for a hue of the output image that gives a small psychological effect so that the color material using amount of the input color space coordinate data is reduced by using the reference value.

According to an embodiment of the present invention, a color material using amount reducing mode is installed in an image processing apparatus so that a color material cost at color printing becomes substantially near a cost at monochrome printing as much as possible with the material cost at the monochrome printing as the reference. In addition, the color material using amount is reduced by considering image quality of an output image and the reducing amount is different between hues. Therefore, the degradation of the image quality can be psychologically minimized.

The features and advantages of the present invention will become more apparent from the following detailed description of a preferred embodiment given with reference to the accompanying drawings.

MODE(S) FOR CARRYING OUT THE INVENTION

Figure 1:
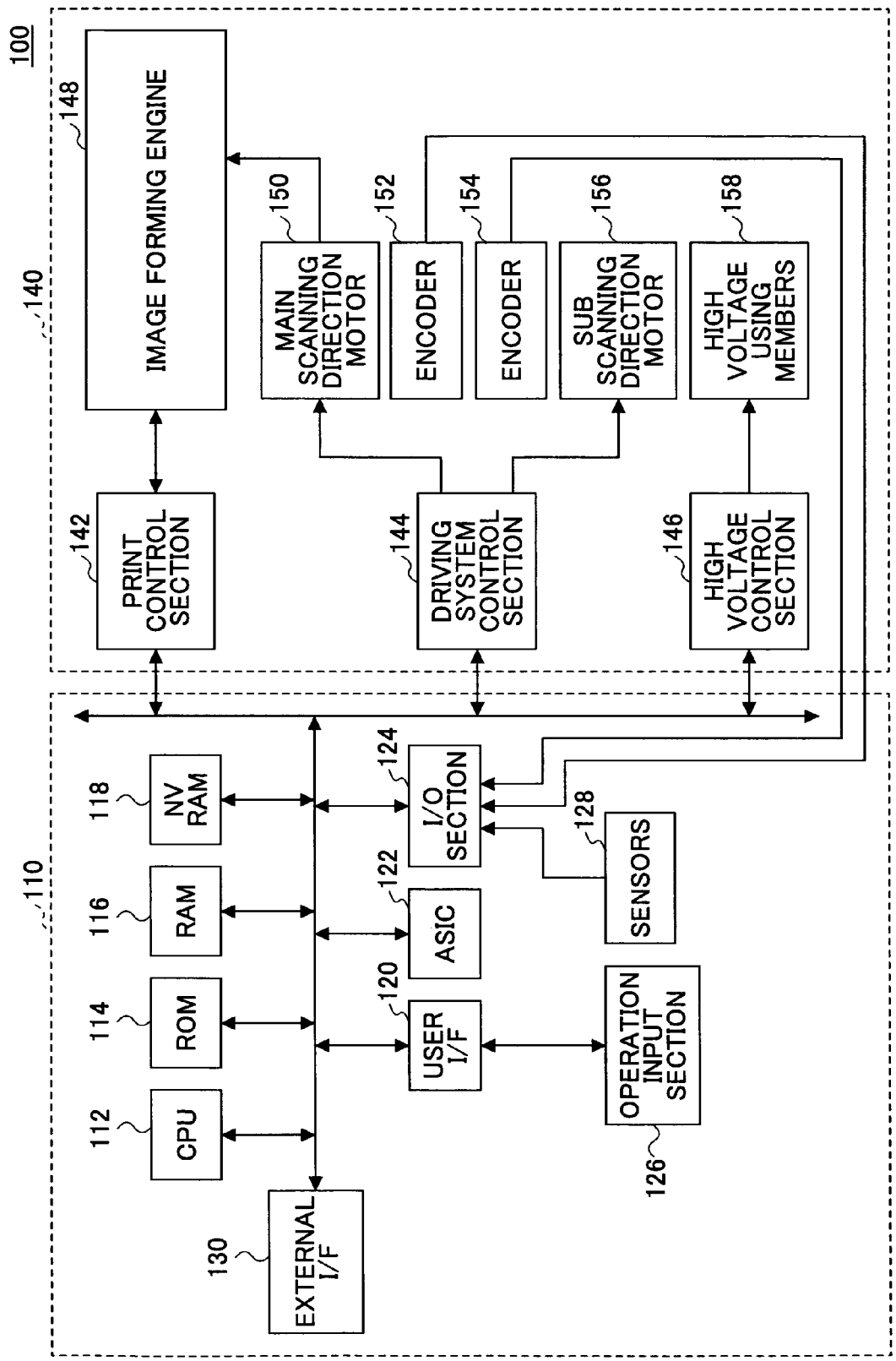
FIG. 1 is a block diagram showing a hardware structure of an image processing apparatus according to an embodiment of the present invention.

Referring to the drawings, an embodiment of the present invention is described in detail.

[Hardware Structure of Image Processing Apparatus]

FIG. 1 is a block diagram showing a hardware structure of an image processing apparatus 100 according to an embodiment of the present invention. The image processing apparatus 100 includes a control section 110 and an image forming section 140 whose operation is controlled by the control section 110. The control section 110 includes a CPU (central processing unit) 112, a ROM 114, a RAM 116, and an NVRAM 118. The CPU 112 controls the entire operations of the image processing apparatus 100. The ROM 114 stores application programs to be executed by the CPU 112 and data to be processed by the CPU 112. The RAM 116 supplies an execution space when the CPU 112 executes a program. In addition, the RAM 116 can be a storage unit for processing image data. The NVRAM 118 temporarily stores data for use in the RAM 116, and data to be stored for a long period of time.

The image processing apparatus 100 receives a user input (instruction) from an operation input section 126 and sends the user input to a user I/F (interface) 120. When the user I/F 120 receives the user input, the user I/F 120 sends a command for executing the user instruction to the CPU 112. The control section 110 further includes an ASIC (application specific integrated circuit) 122 for executing image processes. The ASIC 122 applies the image processes to image data obtained from an application unit such as a scanner application unit and generates output image data to be printed out. The ASIC 122 also functions as a color conversion unit and as an output data generating unit which generates output data in a format such as PDL (page description language) of PostScript (trade mark).

The control section 110 further includes an external I/F 130, and receives image data from an information processing apparatus, for example, a personal computer connected via the external I/F 130, and generates output data to be printed out by applying the image processes to the received image data at the ASIC 122. The external I/F 130 is not particularly limited; however, there are interfaces capable of data transmission such as Ethernet (trade mark), USB (universal serial bus), IEEE 1294, IEEE 802, X, a public telephone network, an ISDN (integrated services digital network), and so on.

When the image processing apparatus 100 is used as a standalone apparatus, for example, in which various applications can be processed, the external I/F 130 can be installed as a modem or a TA/DSU to be connected to the public telephone network or the ISDN. The image processing apparatus 100 can receive compressed data of facsimile, processes the received data, and generate output data. The control section 110 further includes an I/O (input/output) section 124. The I/O section 124 receives signals output from sensors 128 and a rotary encoder (described below) and feeds back the signals for control in the image processing apparatus 100.

The image forming section 140 receives output data and control data from the control section 110 so that the output data from the control section 110 are to be printed out, operates the hardware in the image processing apparatus 100, and outputs the received data as a print document. The image forming section 140 includes an image forming engine 148 which uses an existing image forming process in, for example, one of an inkjet printer and an electrophotographic printer.

The image forming section 140 further includes a print control section 142, a driving system control section 144, and a high voltage control section 146. When the image forming section 140 uses an electrophotographic system, the print control section 142 receives the data output from the control section 110 and controls a semiconductor laser (not shown), a polygon mirror (not shown), and so on corresponding to pixel bits included in the data output from the control section 110. When the image forming section 140 uses an inkjet system, the print control section 142 receives the data output from the control section 110 and drives nozzles of an inkjet head (not shown) by generating a driving pulse of the nozzles corresponding to the data output from the control section 110.

The driving system control section 144 manages and drives of a paper carrying motor (not shown), a clutch (not shown), a separation claw (not shown), and so on for carrying paper for printing corresponding to an image forming process of the image forming engine 148. The driving system control section 144 generates driving pulses for a main scanning direction motor 150 and a sub scanning direction motor 156, moves the inkjet head in the main scanning direction, and supplies the paper for printing to the image forming section 140 by driving a not shown paper carrying motor. When an image is printed on the paper, the paper is output to the outside of the image forming section 140 by driving the sub scanning direction motor 156, and the paper is supplied to a user as a printed document. An encoder 152 detects the number of rotations of the main scanning direction motor 150 and sends the detected result to the I/O section 124, and an encoder 154 detects the number of rotations of the sub scanning direction motor 156 and sends the detected result to the I/O section 124.

When the image processing apparatus 100 forms an image by using an electrophotographic system, a bias voltage generated by the high voltage control section 146 is applied to high voltage using members 158, for example, a charging roller (not shown), a transfer roller (not shown), and a carrying belt (not shown); and a latent image forming process and an image transferring process can be executed. When the image processing apparatus 100 forms an image by using an inkjet system (printer), the bias voltage generated by the high voltage control section 146 is applied to the transfer roller for carrying the paper on which the image is formed so that static electric charges are accumulated on the carrying belt.

Figure 2:
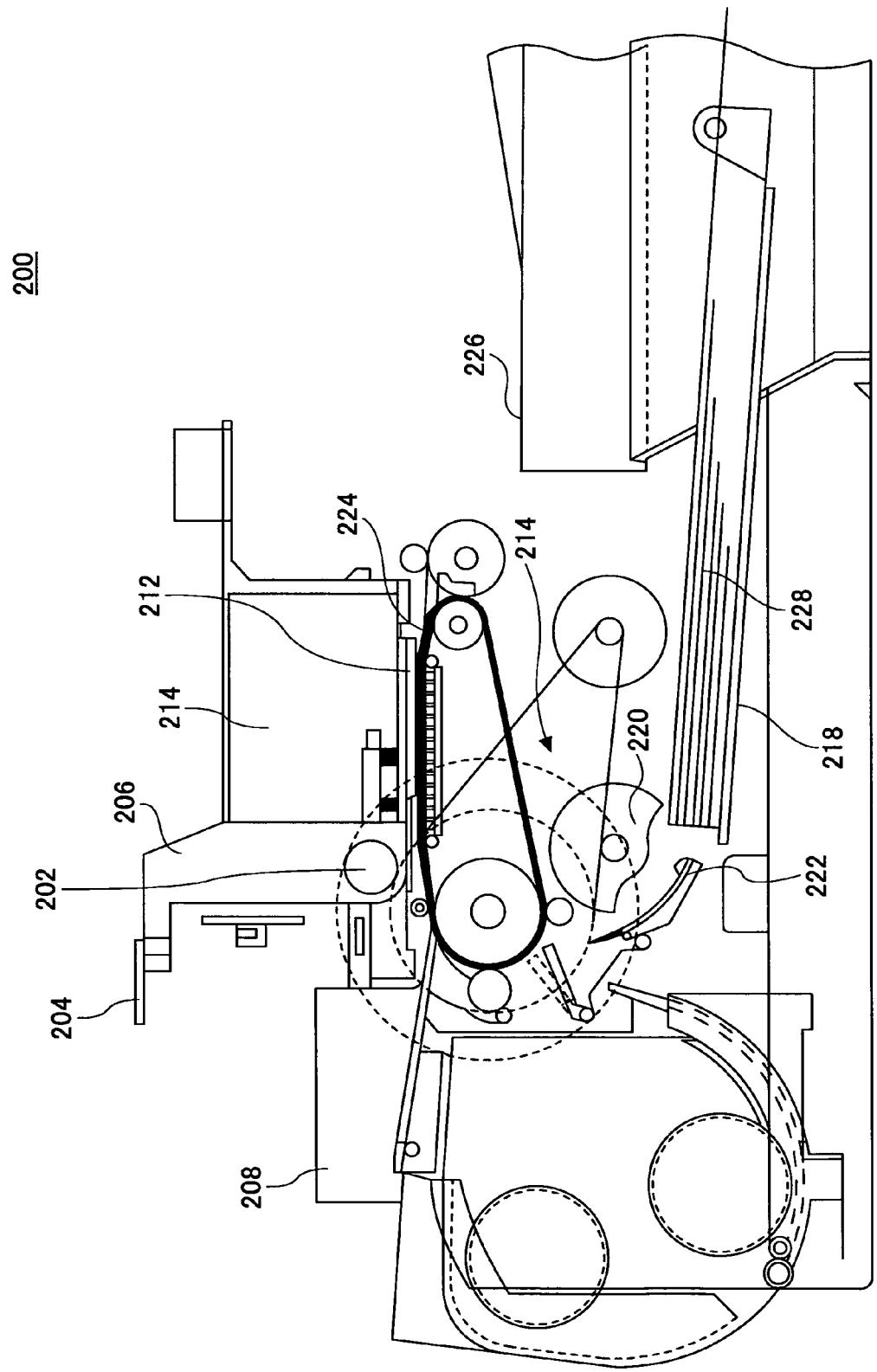
FIG. 2 is a cut-away side view of another image processing apparatus according to the embodiment of the present invention.

FIG. 2 is a cut-away side view of an image processing apparatus 200 according to the embodiment of the present invention. In the present embodiment, the image processing apparatus 200 is an inkjet printer. The image processing apparatus 200 holds a carriage 206 that is slidable in the main scanning direction by a guide rod 202 and a guide rail 204. The guide rod 202 and the guide rail 204 function as guide members. The rotation of a main scanning direction motor 208 is transmitted to a driving member 214 formed of plural driving pulleys, and the carriage 206 is moved in the main scanning direction (orthogonal to the plane of the paper in FIG. 2).

The carriage 206 includes four ink eject heads 212 which eject ink droplets of, for example, yellow (Y), cyan (C), magenta (M), and black (K), respectively. In the ink eject head 212, plural ink eject nozzles are arrayed in the direction orthogonal to the main scanning direction, and the ink droplet ejecting direction is the downward direction.

As the ink eject heads 212, any one of existing ink eject head types can be used in the image processing apparatus 200. For example, the ink eject head 212 can include a piezoelectric actuator using a piezoelectric element, a thermal actuator which uses a phase change by liquid film boiling by using an electric-heat conversion element such as a heat generating resistor, a shape-memory alloy actuator which uses a metallic phase change due to a temperature change, or a static actuator which uses static electric charges, as a pressure generating unit for ejecting ink droplets. In addition, the image processing apparatus 200 can use plural ink eject heads 212 each of which ejects a single color or can use a single ink eject head 212 in which plural nozzles for ejecting corresponding plural colors are integrated.

Sub tanks 214 are disposed in the carriage 206 and the sub tanks 214 supply corresponding color inks to the corresponding ink eject heads 212. The sub tank 214 stores ink in which a color material is dissolved or dispersed in liquid and the ink can be ejected on image receiving paper 228 such as high-quality paper or specially made paper.

Image receiving paper 228 is stored in a paper feeding cassette 218, and is transported to a position of the ink eject heads 212 from a paper feeding section including a paper feeding roller 220 and a paper separation pad 222. The image receiving paper 228 is electrostatically adhered on a transport belt 224 and transported to the position of the ink eject heads 212. An image is formed on the image receiving paper 228 by ink from the ink eject head 212 and is output to a paper outputting tray 226.

Figure 3:
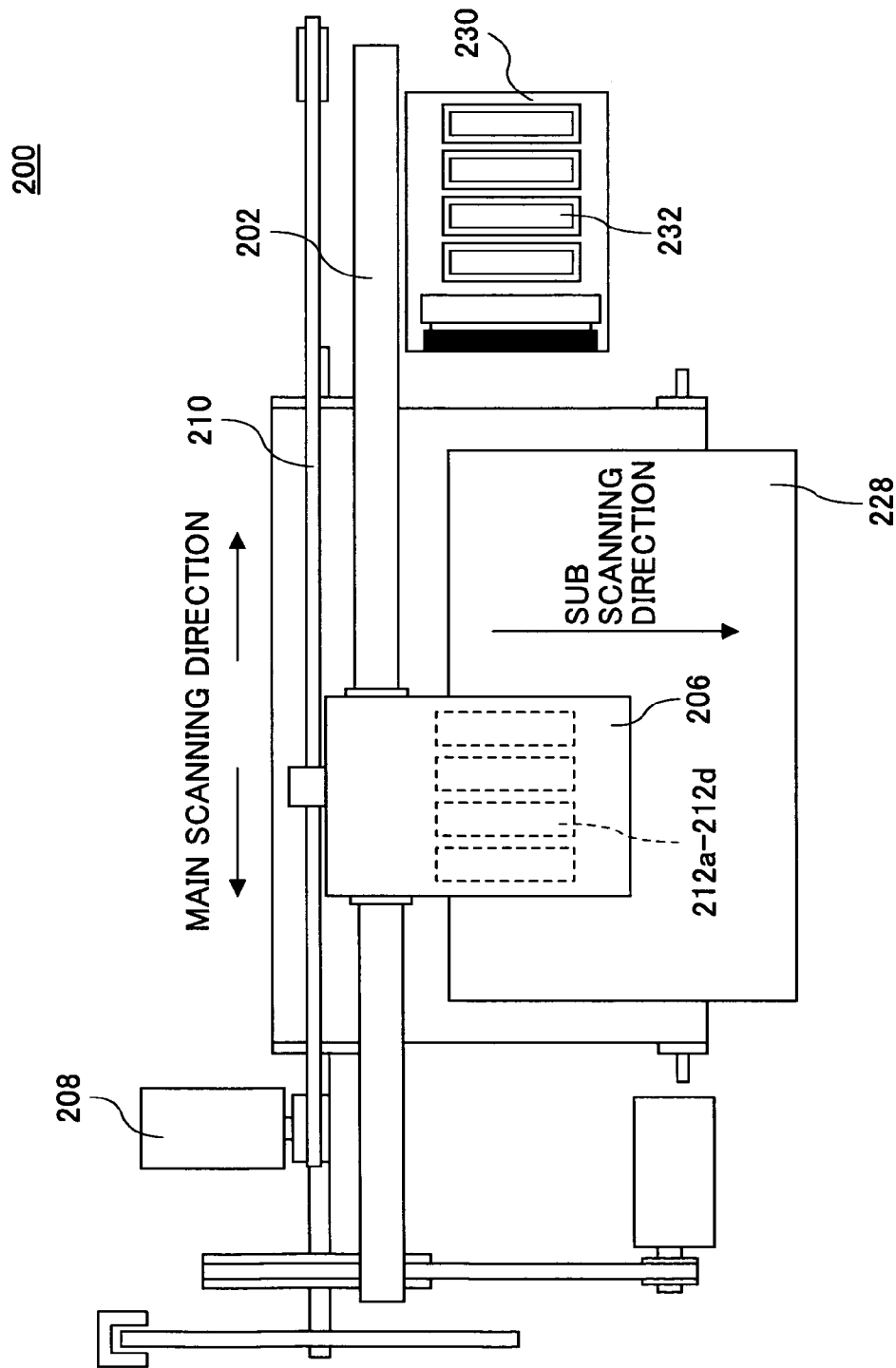
FIG. 3 is a plan view of a part of the image processing apparatus shown in FIG. 2.

FIG. 3 is a plan view of a part of the image processing apparatus 200. In FIG. 3, the right and left direction is the main scanning direction, and as the ink eject heads 212, four ink eject head 212a through 212d for four colors are shown. The image processing apparatus 200 drives the ink eject head 212 (212a through 212d) based on image signals while reciprocally moving the carriage 206 in the arrow direction (the main scanning direction). In an image forming process, the image receiving paper 228 is stopped during the reciprocal movement of the carriage 206, and one line of the image is recorded on the image receiving paper 228 by ejecting ink droplets onto the paper receiving paper 228. Then the image receiving paper 228 is transported by a predetermined amount, and the next line of the image is printed on the image receiving paper 228. When the image processing apparatus 200 detects a recording completion signal sent from the print control section 142 (see FIG. 1) or a signal showing that the end of the image receiving paper 228 reaches an image recording region, the image processing apparatus 200 stops the recording operation and outputs the image receiving paper 228 to the paper outputting tray 226 (see FIG. 2).

The image processing apparatus 200 can include a duplex print function. In a case where the duplex print function is performed, when an image has been printed on a first surface of the image receiving paper 228, the image receiving paper 228 is transported to a duplex print unit by rotating transporting members in reverse with control of the driving system control section 144 (see FIG. 2) so that the sub scanning direction is reversed, and the image receiving paper 228 is reversed. After this, the image receiving paper 228 is transported to the position of the ink eject heads 212 by changing the paper transporting direction in the forward direction, and an image is printed on a second surface of the image receiving paper 228 by sending driving signals to the ink eject head 212.

During a printing standby period, the image processing apparatus 200 moves the carriage 206 to the side of a maintain and recovery mechanism 230, caps nozzle surfaces of the ink eject heads 212, maintains the nozzle surfaces in a moistened condition, and prevents an ink eject defect caused by drying ink.

Figure 4:
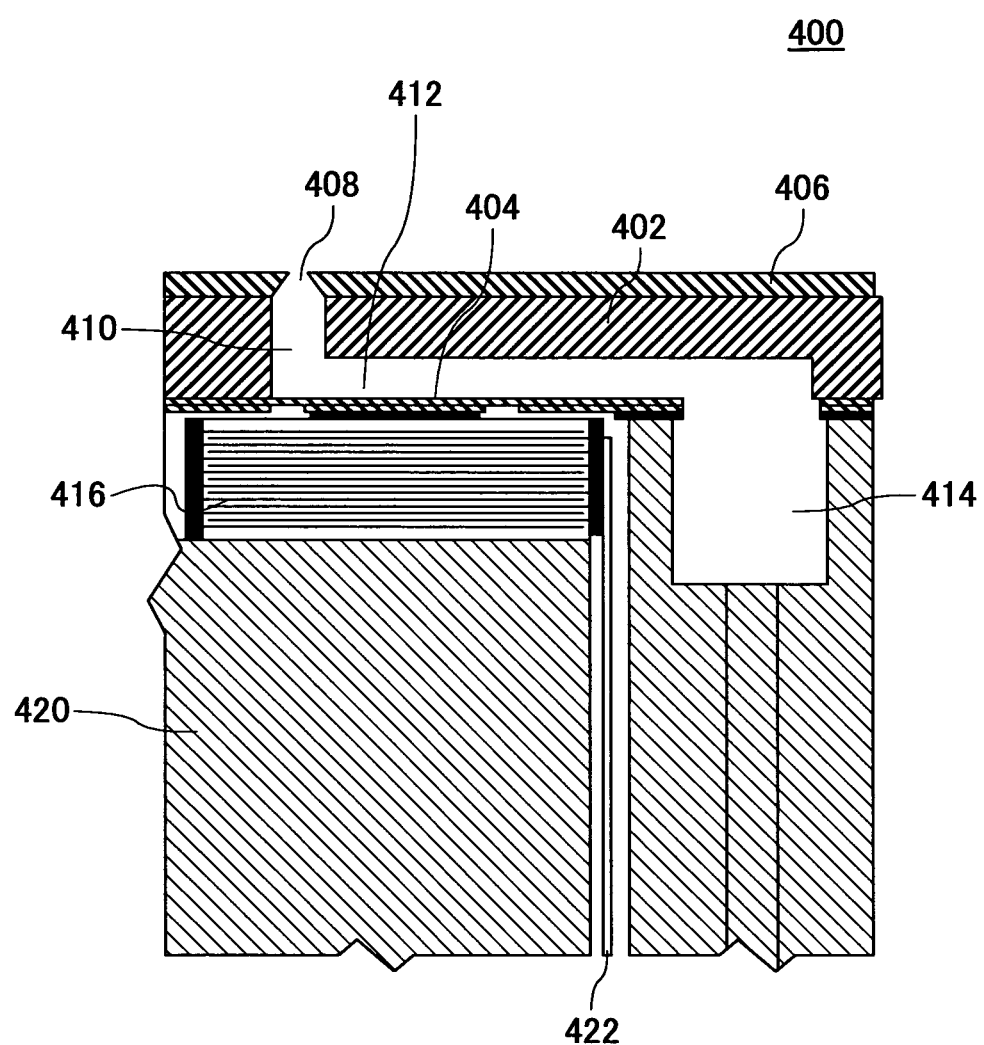
FIG. 4 is a cut-away side view of an ink eject head along a long length direction of a liquid chamber according to the embodiment of the present invention.
Figure 5:
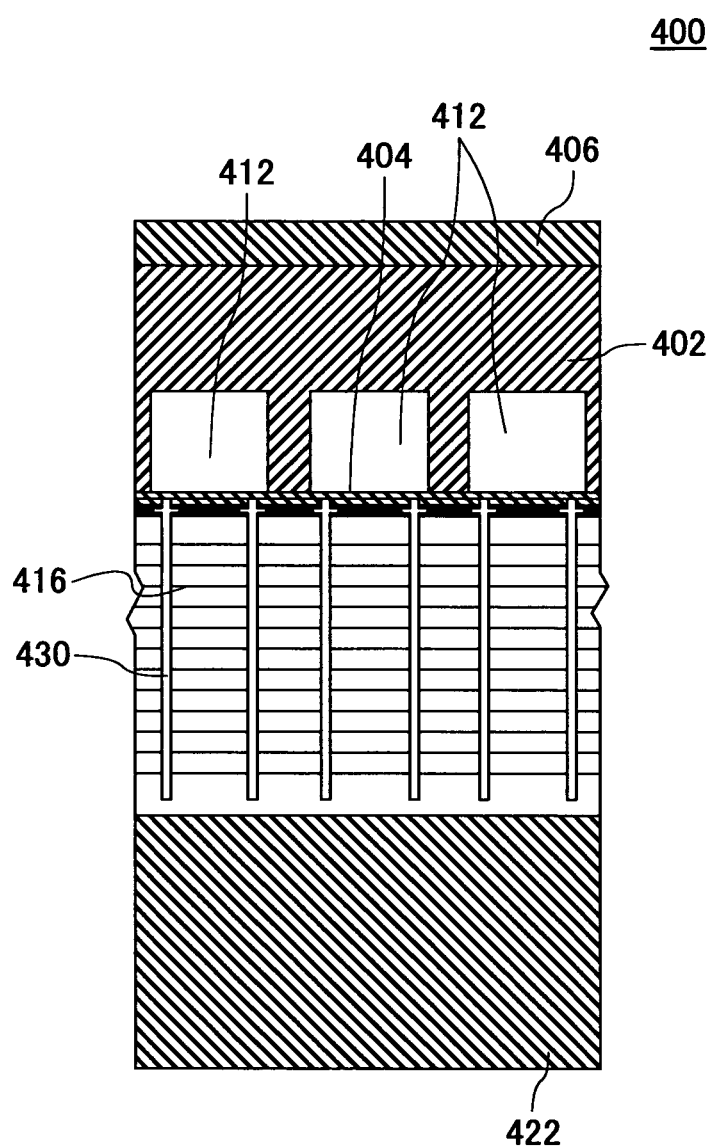
FIG. 5 a cut-away side view of the ink eject head along a short length direction of the liquid chamber shown in FIG. 4.

FIG. 4 is a cut-away side view of the ink eject head 212 along a long length direction of a liquid chamber. FIG. 5 a cut-away side view of the ink eject head 212 along a short length direction (nozzle arraying direction) of the liquid chamber.

In FIGS. 4 and 5, as the ink eject head 212, an ink eject head 400 is shown. However, in the following, the ink eject head 212 is used in the description.

The ink eject head 212 is formed by joining an ink flowing route plate 402, a vibration plate 404 formed on the lower surface of the ink flowing route plate 402, and a nozzle plate 406 formed on the upper surface of the ink flowing route plate 402. The ink flowing route plate 402 is formed by, for example, applying an anisotropic etching to a single-crystal silicon substrate. The vibration plate 404 is formed by a nickel electro-casting method. The above elements form a nozzle 408 for ejecting ink droplets, a nozzle connecting route 410 for connecting to the nozzle 408, and a liquid chamber 412 which is a pressure generating chamber. In addition, the ink eject head 212 includes a common liquid chamber 414 for supplying ink to the liquid chamber 412.

In the present embodiment, as shown in FIG. 4, the ink eject head 212 includes a stacked type piezoelectric element 416 and a base substrate 420 to which the stacked type piezoelectric element 416 is secured. The piezoelectric element 416 deforms the vibration plate 404 and functions to be a pressure generating unit (actuator unit) which applies pressure to ink in the liquid chamber 412. In addition, a signal cable 422 is connected to the piezoelectric element 416. The signal cable 422 supplies a driving signal from a nozzle driving circuit in the print control section 142 (see FIG. 2) to the piezoelectric element 416. The piezoelectric element 416 is driven corresponding to the signal supplied from the print control section 142.

In addition, as shown in FIG. 5, the plural liquid chambers 412 are arrayed and plural color ink droplets are ejected along the main scanning direction. In addition, plural supporting pillars 430 are disposed between the piezoelectric elements 416 for supporting the piezoelectric elements 416.

Referring to FIGS. 4 and 5, a driving sequence of the ink eject head 212 is described. When a voltage to be applied to the piezoelectric element 416 is decreased from a reference voltage, the piezoelectric element 416 contracts and the vibration plate 404 is lowered. At this time, the volume of the liquid chamber 412 is increased and ink flows into the liquid chamber 412. After this, when the voltage to be applied to the piezoelectric element 416 is increased, the piezoelectric element 416 expands in the stacked direction, and the vibration plate 404 is deformed in the direction of the nozzle 408. By the contraction of the liquid chamber 412, a partial pressure is applied to the ink in the liquid chamber 412, and the ink is ejected from the nozzle 408 as ink droplets.

When the voltage to be applied to the piezoelectric element 416 is returned to the reference voltage, the vibration plate 404 returns to an original position, the volume of the liquid chamber 412 is increased, and a suction (negative) pressure is generated. At this time, ink is supplied to the liquid chamber 412 from the common liquid chamber 414. The next time ink ejection is started after the vibration of the meniscus surface of the nozzle 408 is attenuated and becomes stable.

Figure 6:
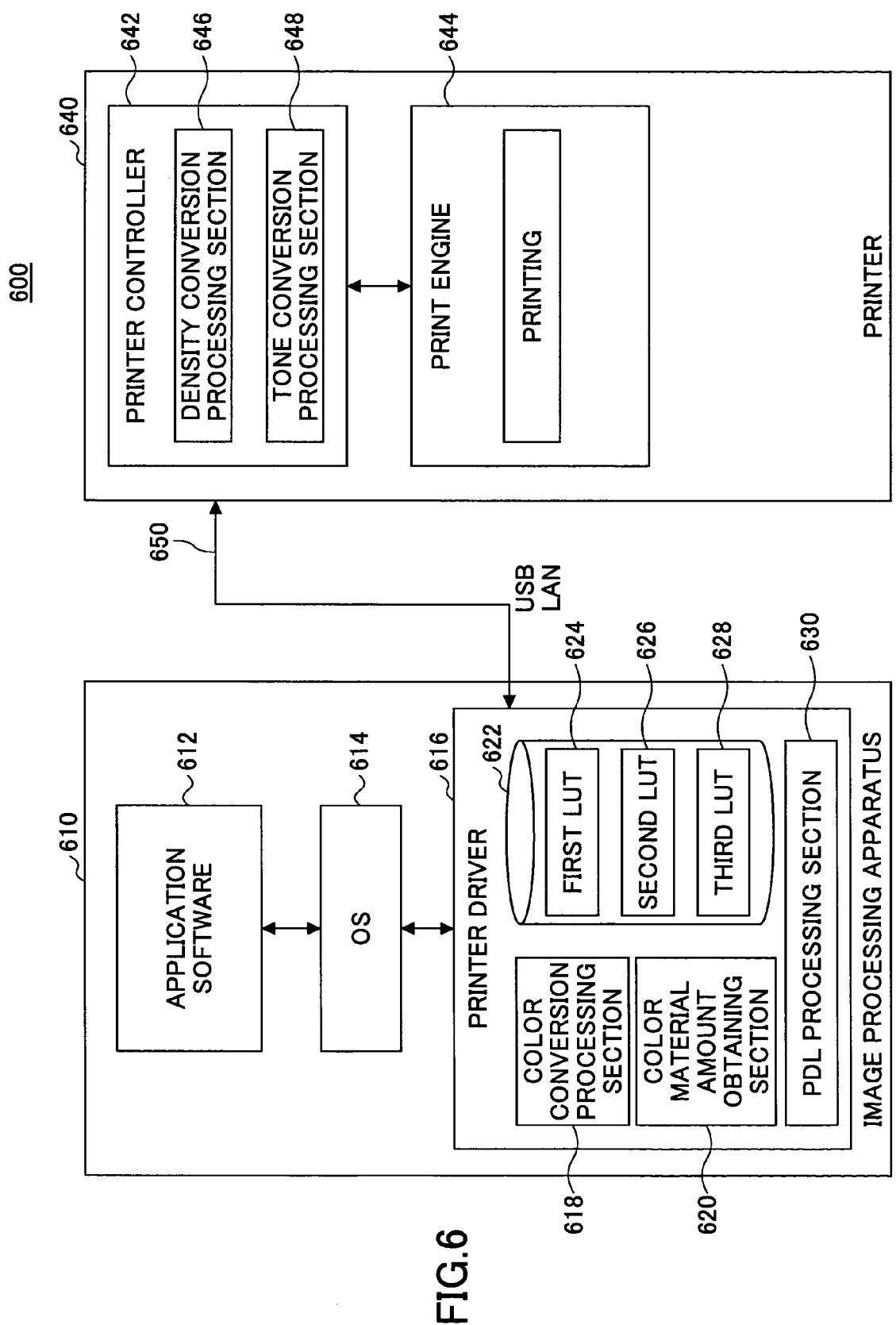
FIG. 6 is a block diagram showing an image processing system according to the embodiment of the present invention.

FIG. 6 is a block diagram showing an image processing system 600 according to the embodiment of the present invention. In FIG. 6, an image processing apparatus 610 is shown. The image processing apparatus 610 is realized by installing a printer driver 616, which performs image processing in the embodiment of the present invention, in a personal computer, or a workstation. In addition, in FIG. 6, an image forming section 640 is an independent printer. The image forming section 640 (printer) converts image data transmitted from the image processing apparatus 610 into control signals by using a printer control language and outputs the signals from a print engine 644. The printer 640 receives the image data described in a format such as PDL (page description language) transmitted from the image processing apparatus 610 via a connection element 650 such as Ethernet, USB, IEEE 1394, IEEE 802, X, and so on.

The image processing apparatus 610 processes, forms, and edits a lot of documents by using application software 612 which is installed as an application unit such as word processor software, image processing software, and spreadsheet software. Execution of the application software 612 is managed by an OS (operating system) 614, and the document can be output, stored, or read. A document formed by a user with the use of the application software 612 is sent to the printer driver 616 based on a user instruction.

When the document includes image data, the printer driver 616 includes a color conversion processing section 618 which functions as a color conversion processing unit and a PDL processing section 630 which functions as an output data generating (forming) unit. The PDL processing section 630 forms output data of a format in PDL such as PostScript (trade mark). The color conversion processing section 618 performs a color conversion process to a CMY(K) system by using such as RGB, XYZ, CIE 1976L*a*b*, and HSV as an input color space coordinate. When application software is formed by a personal computer, the color conversion is performed from a RGB system to the CMY(K) system.

The color conversion to the CMY system is performed by CMM which uses a color conversion table 622 formed as a LUT (look up table). In general, in a color reproduction process using a subtractive color mixing method, a four-dimensional black (K) is introduced from a viewpoint of adjustment of a spectral characteristic of a color material and decrease of an amount of the color material. As the introducing method of the four-dimensional black, several methods are assumed; however, in any method, a CMY value is formed and a three-dimensional CMY system or a four-dimensional CMYK system is registered in the LUT. With this, any color conversion can be realized.

The color conversion processing section 618 converts input color space coordinate data (in this specific case, RGB data) into CMY data. The printer driver 616 further includes a color material amount obtaining section 620. The color material amount obtaining section 620 obtains a color material using amount to be used corresponding to the input color space coordinate data in a color material using amount reducing mode, compares the obtained amount with a threshold value of the color material using amount, and controls the color material using amount in the color material using amount reducing mode.

The color conversion table 622 includes a first LUT 624, a second LUT 626, and a third LUT 628.

The first LUT 624 has an optimal color reproduction data structure and is used in color conversion in which input color space coordinate data such as RGB data are optimally reproduced in a normal mode not for reducing the color material. In the optimal reproduction of the input color space coordinate data, the input color space coordinate data are reproduced by using the entire color region reproduction range of the color material. That is, a default setting is established.

The second LUT 626 is used when the user selects the color material using amount reducing mode. In this case, the color conversion processing section 618 refers to the second LUT 626, and performs the color conversion by using a color material using amount given by a correction function when a color material using amount given in a monochrome standard mode is made to be a reference.

The third LUT 628 is used when the color conversion processing section 618 performs in a fixed coefficient mode by referring to the third LUT 628. The fixed coefficient mode is a color material using amount reducing mode which refers to a CMY value corresponding to a color material using amount formed by multiplying a color material using amount for a full color image by a fixed coefficient which is a positive value 1 or less. The fixed coefficient can be arbitrarily selected corresponding to a specific structure, for example, in a structure in which a CMY value is obtained by multiplying a coefficient by an input color space coordinate value, or in a structure in which a value is obtained by multiplying a coefficient by the obtained CMY value when the linearity of the mode is arbitrarily corrected.

The first through third LUTs 624, 626 and 628 are loaded in a RAM and so on from an HDD when the image processing system 600 is started up, and are used by the color conversion processing section 618. As shown in FIG. 6, the second and third LUTs 626 and 628 for the color material using amount reducing modes can be independently formed. In addition, the second and third LUTs 626 and 628 can be formed as an integrated unit.

In the present embodiment, when the printer driver 616 is installed in a personal computer, the first through third LUTs 624, 626, and 628 have been formed beforehand by using a LUT forming device, for example, a workstation, and can be delivered to the personal computer together with a ROM or a program. In this case, when the printer driver 616 is installed in the personal computer, the user of the personal computer stores the LUTs 624, 926, and 628 in an HDD. In addition, when the image processing apparatus 610 is a workstation or a server for only image processing, the printer driver 616 forms the LUTs 624, 626, and 628 as modules of image processing application software on demand based on the user setting.

The image forming section (printer) 640 includes a printer controller 642 and the print engine 644. The printer controller 642 forms output data special for a printer and sends the output data to the print engine 644. In forming the output data, the printer controller 642 correlates tone data after a γ correction process to a predetermined dither pattern by using the density conversion processing section 646, and applies an area conversion to the tone data by using the tone conversion processing section 648. The print engine 644 has a structure similar to the structure of the image forming section 140 shown in FIG. 1, and forms an image on image forming paper by using the output data with the use of an electrophotographic method or an inkjet method.

Figure 7:
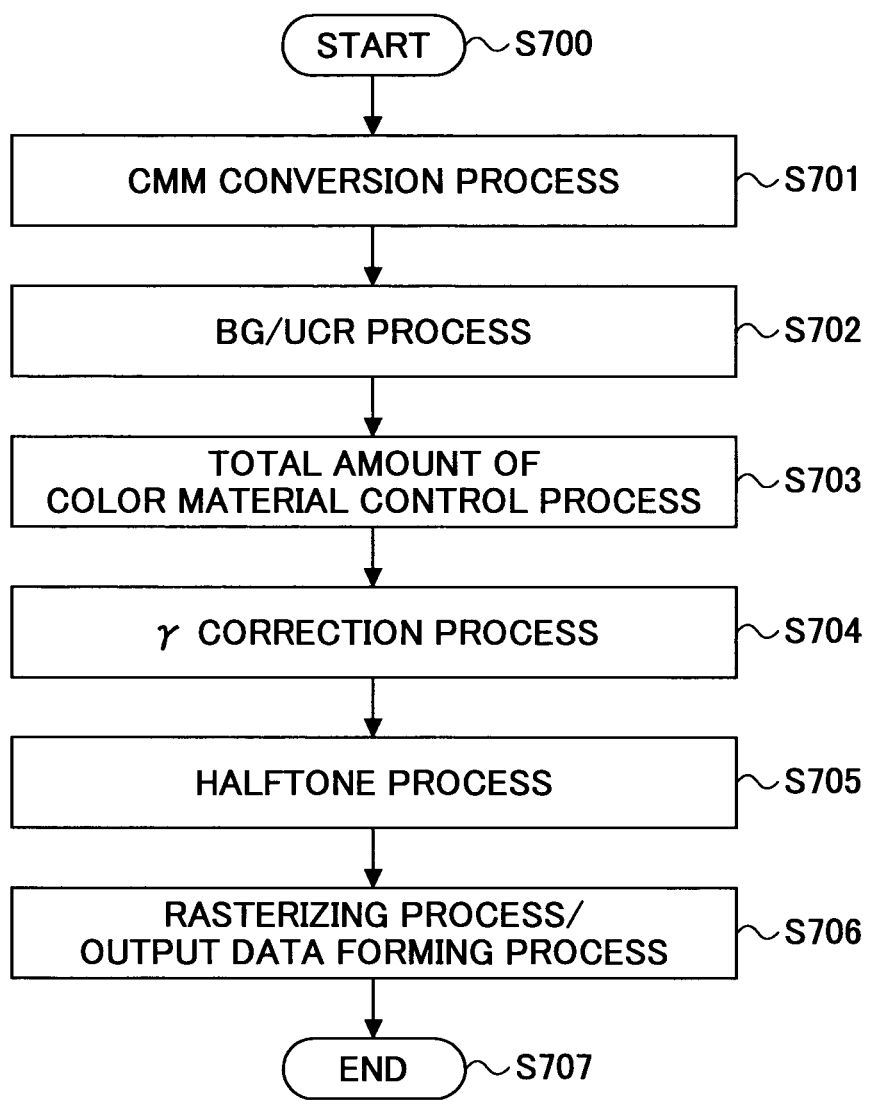
FIG. 7 is a flowchart showing output data forming processes including a color conversion process according to the embodiment of the present invention.

FIG. 7 is a flowchart showing output data forming processes including a color conversion process according to the embodiment of the present invention. The processes shown in FIG. 7 are performed by the ASIC 122 shown in FIG. 1, and are performed by the printer driver 616 shown in FIG. 6. In FIG. 7, a CMM (color) conversion process is applied to image data based on a color material using mode selected by a user by using the LUT 624, 626, or 628 (S701). Next, a BG/UCR process is applied to the image data for determining a black (K) amount and three-dimensional CMY data are converted into four-dimensional CMYK data (S702).

Next, a total amount of color material control process is applied to the CMYK data for controlling the total amount of the color materials (S703). After this, a γ correction process and a halftone process are applied to the CMYK data (S704 and S705). In the halftone process, an identification value of a dither matrix corresponding to tone level data after the γ correction process is selected and the image data are converted into area expression data. Next, a rasterizing process, a font data identification process, and a paging and command adding process are applied to the image data and the output data are formed (S706).

The above processes can be applied to the normal mode and the color material using amount reducing mode. In the normal mode, a full color image is output by using a color material amount in which the entire color region reproduction range of a printer can be expressed, and in the normal mode, the CMM conversion process (S701) is different from that in the color material using amount reducing mode. In the color material using amount reducing mode, the color material using amount is decreased.

Figure 8:
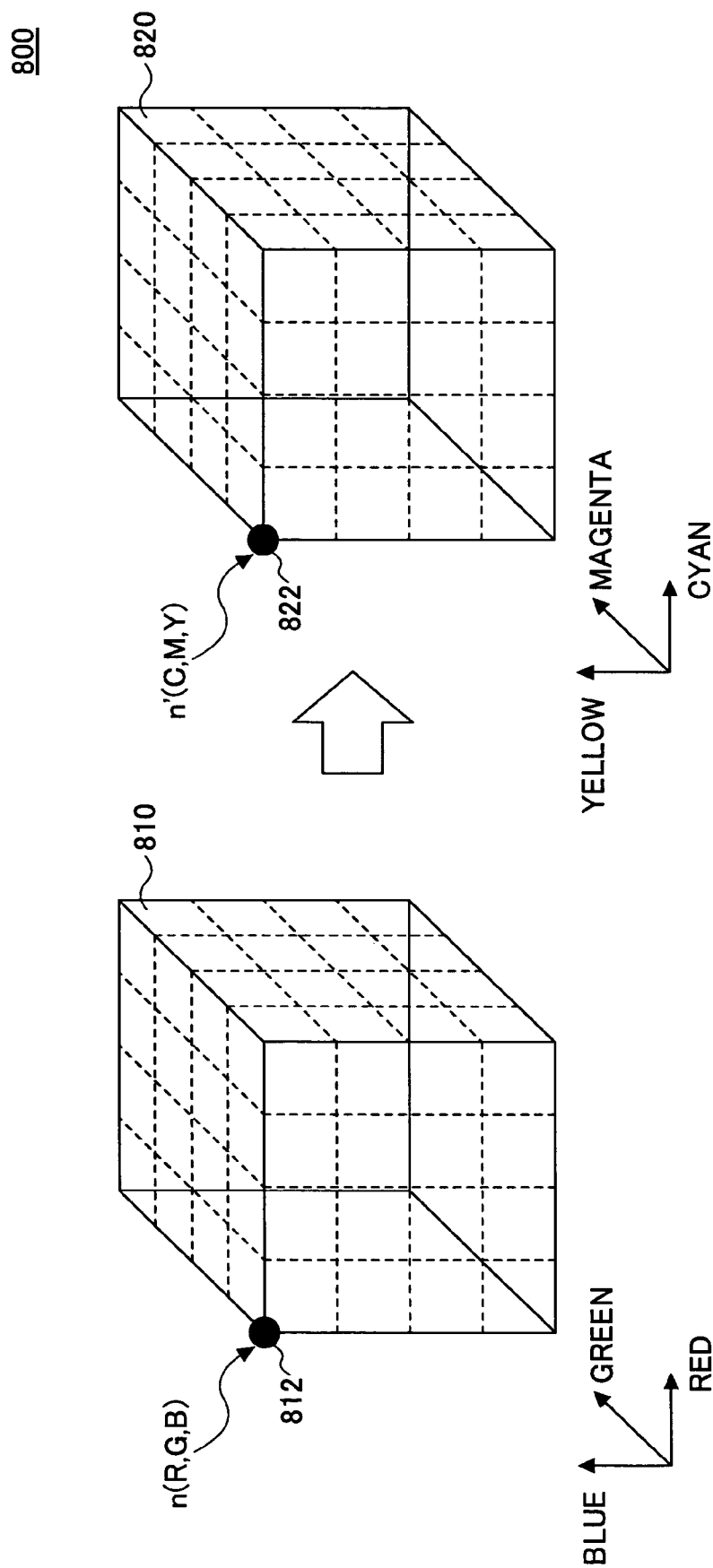
FIG. 8 is a diagram showing a color conversion process using CMM according to the embodiment of the present invention.

FIG. 8 is a diagram showing a color conversion process using CMM according to the embodiment of the present invention. A document (image data) formed by application software is formed as input color space coordinate data independent from a printer, for example, as RGB data. The printer must print the document by using CMY(K) data of a subtractive color mixing system. Therefore, when the RGB data of the document are converted into CMY data or CMYK data dependent on the printer, a LUT has been prepared beforehand, and an RGB three-dimensional solid 810 is converted into a CMY three-dimensional solid 820 by using the LUT.

A most direct color conversion process from RGB data to CMY data is exemplified in FIG. 8. As shown in FIG. 8, generally, in order to reduce a data amount in a LUT, the LUT is formed at sample points of color solids, and output color data n'(C,M,Y) 822 is obtained from input color data n (R,G,B) 812 by arbitrarily applying an interpolation process. After this, generally, the printer performs a printing output process in a four-dimensional color space of a CMKY system, the BG/UCR process is applied to the data, and printer specific data are converted from CMY data to C' M' Y' K' data.

In the embodiment of the present invention, the image processing apparatus 100 (610) selects the normal mode or the color material using amount reducing mode based on a user instruction, and performs a color conversion process corresponding to the selected mode. The normal mode means a print mode in which printing is performed by a color material using amount which optimally reproduces the entire color region reproduction range of the image forming section 140 or the printer 640. In addition, the color material using amount reducing mode means a print mode in which printing is performed by a color material using amount less than the color material using amount for optimal reproduction by considering reduction of print cost even if a reproducible color region of the image forming section 140 (640) is decreased. In the color material using amount reducing mode, the color region reproduction range is reduced; however, the amount of consumed goods such as toners and ink is reduced, and color printing can be performed at a cost substantially equal to in monochrome print.

When the color region reproduction range is reduced, degradation of image quality such as low color density and low contrast may occur. In the color material using amount reducing mode of the embodiment of the present invention, a color conversion process is performed in which the degradation of the image quality is minimized while reducing the color material using amount as much as possible.

[Color Material Using Amount Reducing Mode]
[Monochrome Standard Mode]

A monochrome standard mode is a color material using amount reducing mode which uses CMY data to reproduce an image with a color material using amount when a monochrome halftone image is obtained by applying a NTSC conversion to input color space coordinate data. The second LUT 626 can be used when the color material using amount is reduced in the monochrome standard mode depending on hue and image data characteristics.

In addition, the second LUT 626 can be also used in a color conversion in which the second LUT 626 is adjusted by using a correction function so as to control the color material using amount as the color material using amount in the monochrome standard mode is a reference when the color material using amount is more than a threshold value.

In this, the monochrome standard mode is defined to be a color output mode with a color material using amount in an "s"% (s is an integer 0 to 100) range with a "K" amount (black color material amount) as the reference to be output when a color image is converted into a monochrome image. The amount "K" to be output is obtained by Mathematical Formula (1) when a color image is converted into a monochrome image.

[Mathematical Formula (1)]

$$K=(R\times360+G\times601+B\times117)/1024 \quad (1)$$

The third LUT 628 is used for a color conversion of a fixed coefficient mode as a color material using amount reducing mode. The fixed amount mode is defined as a print mode in which a color material using amount when an input color space coordinate is to be output in a normal mode is multiplied by a fixed coefficient Fix (an integer of 0 to 100). When the color material using amount is multiplied by the fixed coefficient Fix in the fixed coefficient mode, the color material using amount in the normal mode can be obtained from an actually measured value in each tone, or from the number or weight of ink droplets to be output in an area allocated to a predetermined tone level.

[Forming Second and Third LUTs and Data Structure]

Next, forming the second and third LUTs 626 and 628 and the data structure of the LUTs 626 and 628 are described.

Figure 9:
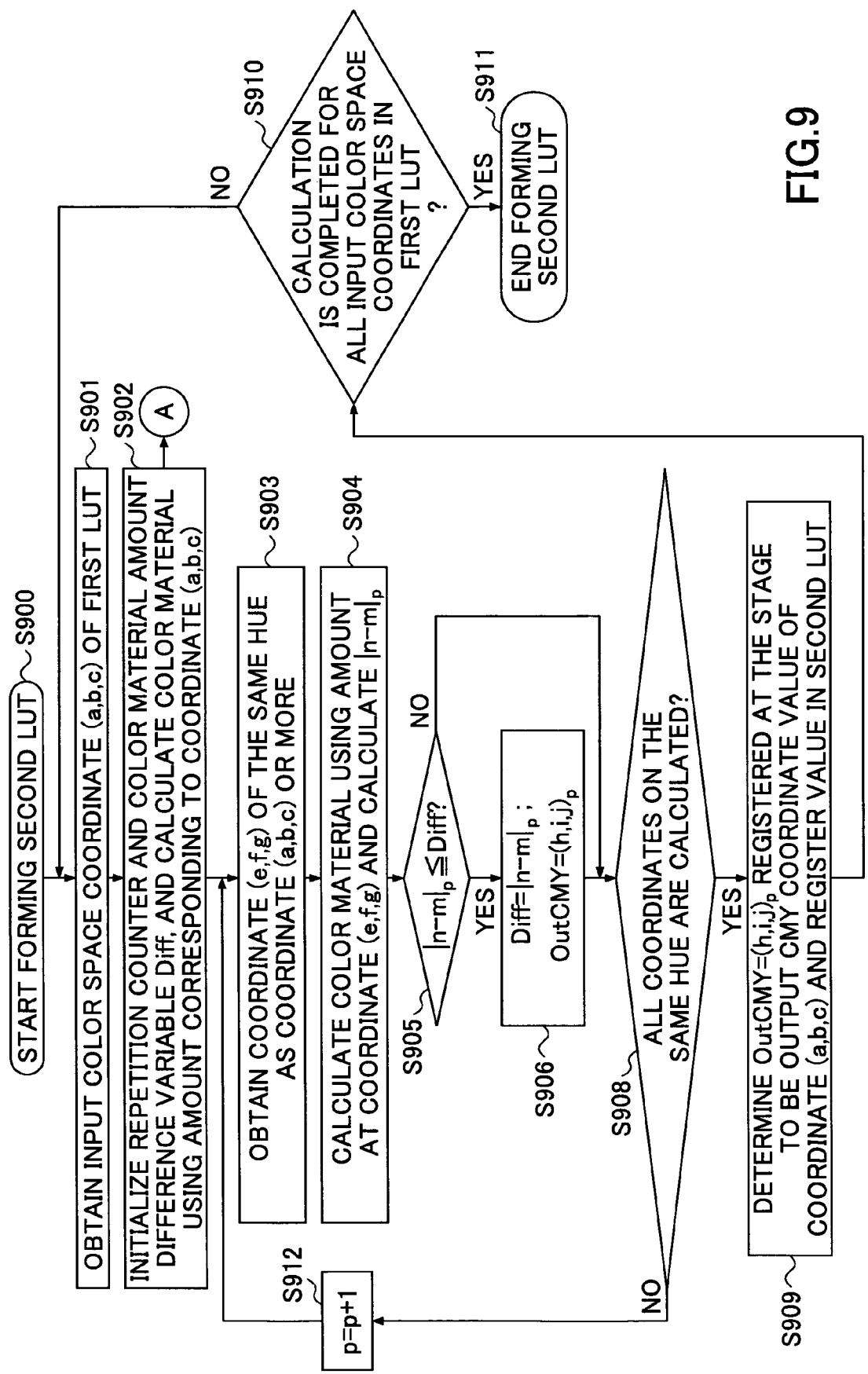
FIG. 9 is a flowchart showing processes forming a second LUT shown in FIG. 6.

FIG. 9 is a flowchart showing processes forming the second LUT 626. First, an input color space coordinate point (a, b, c) of the first LUT 624 is obtained (S901). Next, a repetition counter "p" and a color material amount difference variable Diff are initialized and a color material using amount Dmono [m] of a CMY coordinate point corresponding to the coordinate point (a, b, c) is calculated (S902). The color material using amount Dmono[m] is calculated from (c×K×s) where "K" is obtained from Mathematical Formula (1) and "c" is a proportional constant to obtain the color material using amount of "K" given in the NTSC conversion in the monochrome standard mode, and the Dmono[m] is calculated to be a level value of the color material using amount Dcolor in the normal mode.

The color material using amount Dmono[m] can be calculated by any method when the same relationship as that above is given. In FIG. 9, the processes in the color conversion process are shown when the color material using amount is reduced in the monochrome standard mode; however, when the value of the Dmono[m] is given in a color material using amount range having a set threshold value or more by a correction function, a data structure can be established which can be commonly used within the fixed coefficient mode.

The processes on and after S903 correspond to forming processes of the second LUT 626. In addition, the third LUT 628 to be used in the fixed coefficient mode is formed in processes shown in FIG. 11 connected to A point from S902. The initial value of the color material difference variable Diff is determined to be a value greater than the maximum color material difference.

A coordinate point (e,f,g) is obtained from the first LUT 624 (S903) The coordinate point (e,f,g) has the same hue as that of the coordinate point (a,b,c) and its luminance L* is the luminance of the coordinate point (a,b,c) or more. When the same hue and the coordinate point (e,f,g) are obtained, the coordinates of a sample point having ΔHue<ϵ are obtained from sample points on the first LUT 624, and the obtained coordinate point is registered in a set variable or an array variable. ΔHue is ϵ hue difference between the coordinate point (a,b,c) and the coordinate point (e,f,g), and is given by Δ{sqrt((a*)²+(b*)²)}; and "ϵ" is a positive small decimal fraction. A color material using amount Dcolor[n] at the coordinate (e,f,g) and a value of |n−m|$_p$ is calculated (S904). Then |n−m|$_p$≤Diff is determined (S905).

When YES in S905, Diff=|n−m|$_p$ and OutCMY=(h,i,j)$_p$ are set (S906). At this stage, a sample point having the minimum color material amount difference and the same hue on the first LUT 624 corresponding to the coordinate point (a,b,c) is obtained. Next, it is determined whether all coordinate points on the same hue are calculated (S908). When NO in S908, the repetition counter p is incremented (S912), the process returns to S903 and a registered next coordinate point (e',f',g') is obtained, and repeats the processes from S903 through S908.

When YES in S908, OutCMY=(h,i,j)$_p$ registered at the stage is determined to be an output CMY coordinate value of the coordinate point (a,b,c) and the determined CMY coordinate value is registered in a coordinate point (a,b,c) record of the second LUT 626 (S909).

Then it is determined whether calculation is completed for all input color space coordinates entered in the first LUT 624 (S910). When NO in S910, the process returns to S901, and the processes on and after S901 are repeated. When YES in S910, forming the second LUT 626 ends (S911).

At this stage, the input color space coordinate point and the CMY coordinate point which give a density of the monochrome standard mode are registered in the second LUT 626. Therefore, by the color conversion referred to the second LUT 626, the CMY value, which gives a color material using amount in the monochrome standard mode in which the luminance is high and the hue is the same, can be obtained from the input RGB coordinates. After this, the BG/UCR process is applied to the obtained CMY value, four-dimensional color space data C, M, Y, K are formed, and output data are formed by the processes shown in FIG. 7.

The processes shown in FIG. 9 can be used in the color material using amount reducing mode. The color material using amount reducing mode uses both the fixed coefficient mode to be used near the predetermined threshold value and the monochrome standard mode which uses the second LUT 626 adjusted by a correction function.

Figure 10:
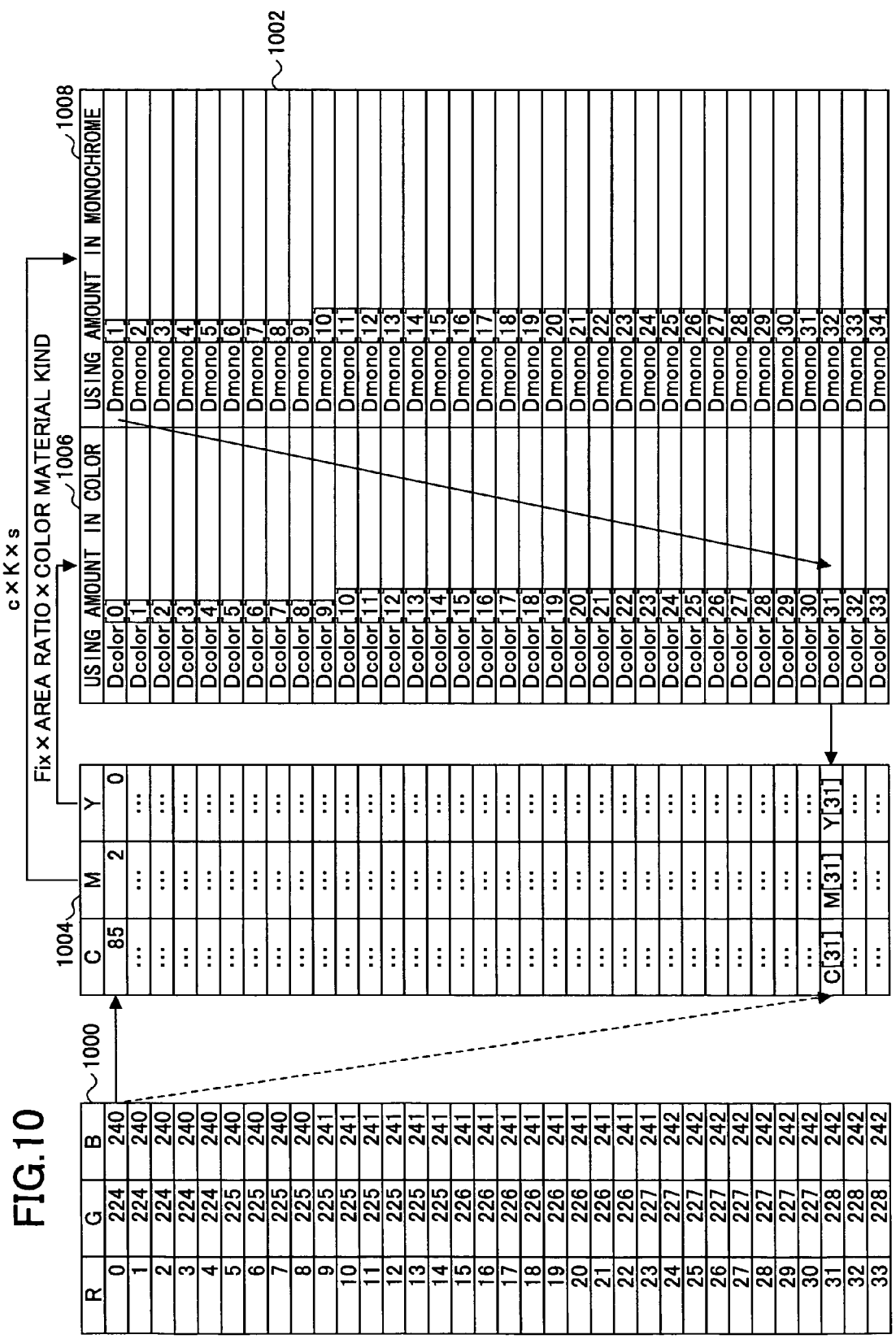
FIG. 10 is a diagram showing processes forming the second LUT shown in FIG. 6.

FIG. 10 is a diagram showing a second LUT forming processes. In FIG. 10, the processes are graphically shown. Similar to the first LUT 624 which is used in the normal mode, an input color space coordinates 1000 corresponding to a color space solid are registered in the second LUT 626. In addition, CMY coordinate values 1004 corresponding to the input color space coordinates 1000 are registered in the second LUT 626. When the second LUT 626 is compared with the first LUT 624, a low value of the color material using amount is substituted for the CMY value to be related to the input color space coordinates. The second LUT 626 can be formed by an LUT forming device independent from the image processing apparatus 100 (610), or can be formed by the image processing apparatus 100 (610) on the fly based on the user instruction.

In forming the second LUT 626, an RGB value of a sample point of the first LUT 626 is selected from the input color space coordinates 1000, and a CMY color space coordinate corresponding to the selected coordinates are obtained. The second LUT 626 includes a color material amount Dcolor to be used in the normal mode at the obtained CMY point, and color material using amount corresponding data 1002 which registers a color material using amount to be used in the monochrome standard mode. In the color material using amount corresponding data 1002, color material amount conversion fields 1006 and 1008 are registered corresponding to each tone level.

When the input color space coordinate point is obtained, a color material using amount Dmono[1] in the monochrome standard mode corresponding to the field 1008 is obtained. After this, coordinate values whose hue is the same and whose luminance is higher than those in the coordinate values are listed up from the input color space coordinates 1000. Then a Dcolor[min] whose color material using difference Diff is a minimum value is obtained in the listed up sample points from the field 1006, a CMY value in the first LUT 624 indexed to the Dcolor [min] is obtained, and the obtained CMY value is registered in the field of the CMY coordinate value 1004 as a target color space coordinate of the input color space coordinate corresponding to the second LUT 626. With this, the second LUT 626 is formed.

Therefore, in the second LUT 626, different from in the first LUT 624 in which the relationship between the RGB data and the CMY data is described, as shown by a dashed line in FIG. 10, the RGB data are described in a relationship with the color difference minimum C'M'Y' data. In addition, when the second LUT 626 is adjusted by using a correction function, since the value of Dmono[m] can be set to a using amount given from the monochrome normal using amount by the correction function, the second LUT 626 can be adjusted.

In the above, the RGB data are converted into the CMY(K) data which can be used in a printing device. However, in the embodiment of the present invention, other data, for example, Yuv data and XYZ data other than the RGB data can be converted into actually usable data in the printing device. In addition, the color materials are not limited to CMYK materials, and the present embodiment can be applied to special colors such as light cyan and light magenta.

Figure 11:
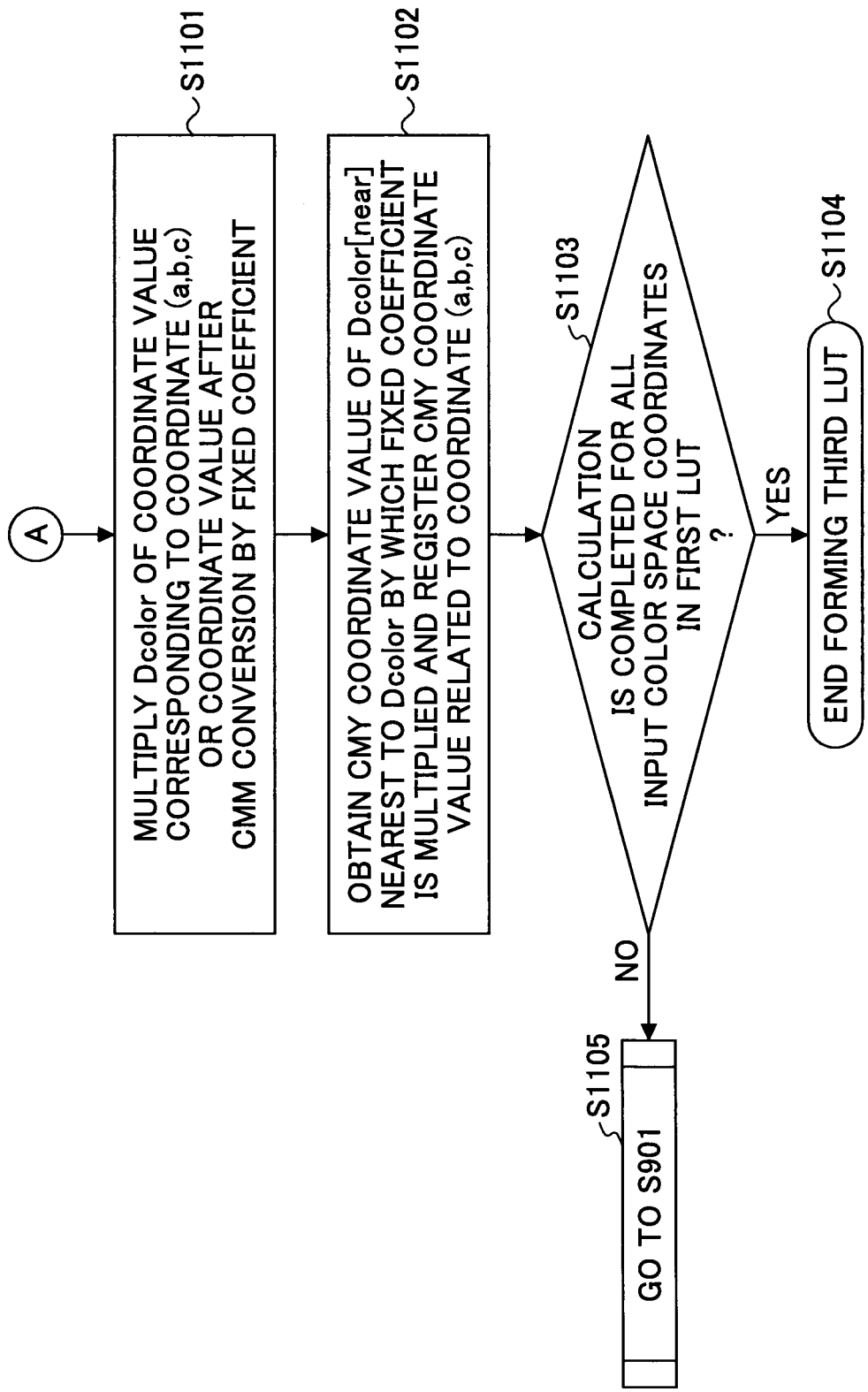
FIG. 11 is a flowchart showing processes forming a third LUT shown in FIG. 6.

Next, referring to FIG. 11, forming the third LUT 628 is described. FIG. 11 is a flowchart showing processes forming the third LUT 628. As shown in FIG. 11, the processes start from the connection point A in FIG. 9. First, a fixed coefficient is multiplied by a color material using amount Dcolor of a coordinate value corresponding to a coordinate point (a,b,c) or a coordinate value (CMY) after the CMM conversion (S1101). Next, a CMY coordinate value having Dcolor[near] nearest to the color material using amount by which the fixed coefficient is multiplied and the obtained CMY coordinate value is registered by being related to the coordinate point (a,b,c) (S1102).

Next, it is determined whether calculation is completed for all the input color space coordinates in the first LUT 624 (S1103). When YES in S1103, forming the third LUT 628 ends (S1104). When NO in S1103, the process goes to S901 shown in FIG. 9 (S1105). In S901, a new input color coordinate value (a',b',c') is obtained, and the processes from the point A are performed.

By the above processes, the CMY coordinate point is registered in the third LUT 628 which gives a density in a relationship between the input color space coordinate point and the fixed coefficient mode. In the color conversion process using the second LUT 626 and the third LUT 628, an interpolation calculation between the sample points can be performed by using the correction function used in the first LUT 624.

In addition, when the third LUT 628 is formed, a set of plural third LUTs 628 can be formed by changing the Fix value (fixed coefficient) with an interval of, for example, 10%. With this, when a printer driver is installed in the image processing apparatus 100 (610), the set of the plural third LUTs 628 can be installed. Therefore, in this case, a user can select a color material using amount reducing mode having a different fixed coefficient from a print wizard of the image processing apparatus 100 (610).

When the second LUT 626 and the third LUT 628 are formed, characteristic curves of the color material using amounts are calculated which are given by the second LUT 626 and the third LUT 628 related to the input color space coordinates. When an intersection point exists between the characteristic curves of the second and third LUTs 626 and 628, a difference between a color material using amount of the second LUT 626 after the intersection point and a total color material using amount of the second LUT 626 is minimized, and a difference between a color material using amount of the third LUT 628 before the intersection point and the total color material using amount of the second LUT 626 is minimized.

In order to achieve the above, a correction function is formed which determines that the color material using amount after the intersection point is to be smaller than the color material using amount in the monochrome standard mode, and a CMY value is obtained from the first LUT 624 in which the difference of the color material using amount given by the correction function and the hue difference are minimum values, and the second LUT 626 is adjusted. At this time, s %=(a correction function value/a monochrome standard mode value)×100 is given.

In addition, when the intersection point does not exist or the intersection point exists at an extreme highlight color side or at a shadow color side, the value in the second LUT 626 is adjusted near a threshold value which has been set beforehand by considering the color material using amount. The threshold value can be set in the color material using amount or in the tone level of the CMY of the image.

[Color Material Using Amount Characteristics]

Figure 12:
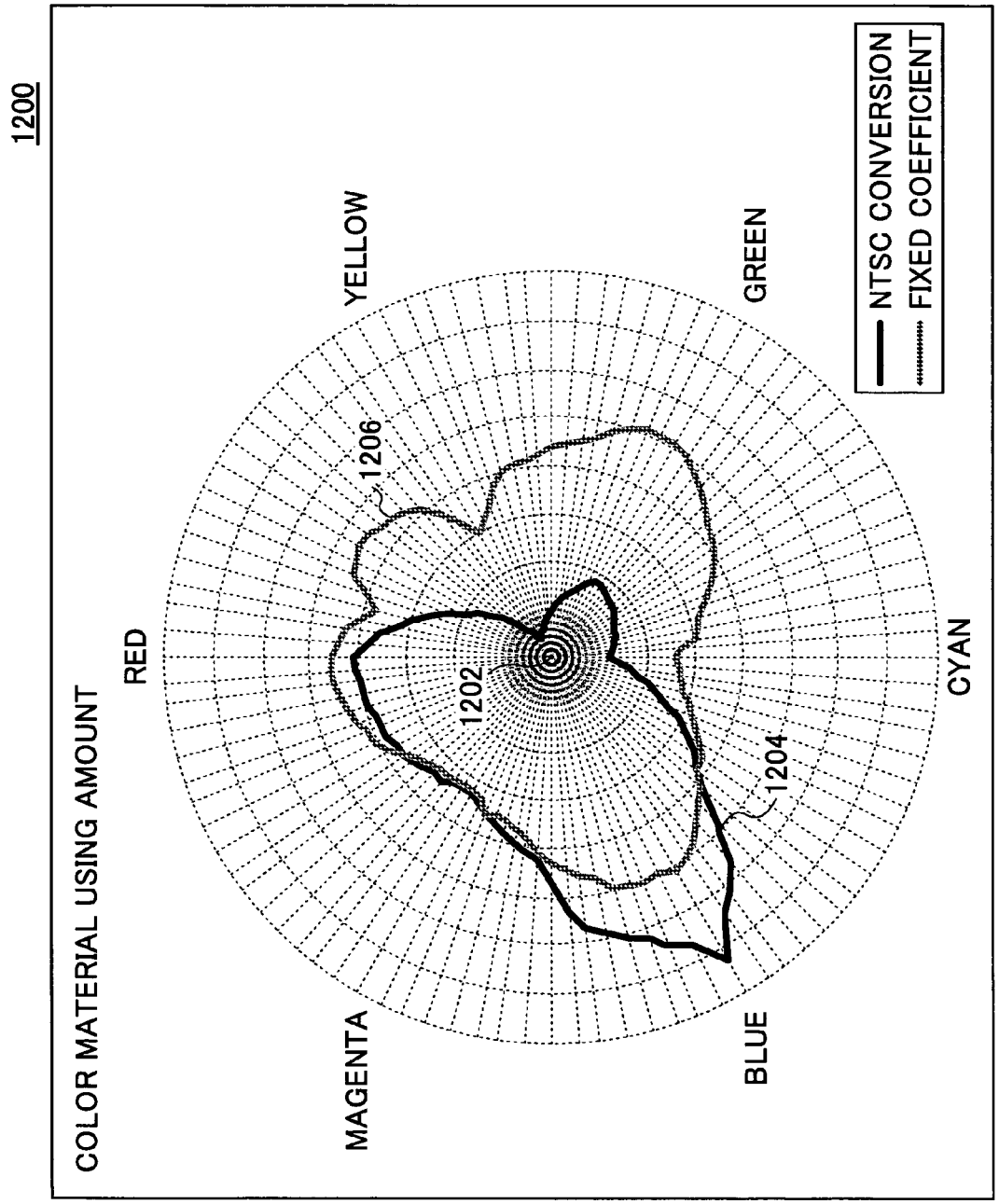
FIG. 12 is a diagram of an a comparison example showing color material using amounts in different modes.

Color material reducing amounts in the color material using amount reducing mode which uses the second and third LUTs 626 and 628 are compared between the monochrome standard mode (s=100%) and the fixed coefficient mode (Fix=0.5). FIG. 12 is a diagram showing the comparison example. In FIG. 12, observation data of color material using amount characteristics 1200 in the monochrome standard mode and the fixed coefficient mode are shown. A CMY hue and an RGB hue are shown on the paper surface, and the color material using amount is plotted as a distance from the center 1202. When the distance from the center 1202 is large, the color material using amount is increased. A line 1204 shows the color material using amount in the monochrome standard mode using an NTSC conversion, and a line 1206 shows the color material using amount in the fixed coefficient mode.

As shown in FIG. 12, in the fixed coefficient mode shown by the line 1206, the color material is substantially uniformly reduced in each hue. On the other hand, in the monochrome standard mode shown by the line 1204, the color material is extremely reduced in the Y hue. In addition, in the monochrome standard mode shown by the line 1204, the color material reducing effect is low in the B hue. In the NTSC conversion, a coefficient corresponding to a visual appreciation characteristic of a person is multiplied for the input RGB data, and the data is output as K data; therefore, the reducing amount in Y becomes great. At this time, even if the Y hue is output in a maximum level, the Y hue having high luminance is processed as very light gray, and the B hue having low luminance is processed as dark gray. Therefore, in the monochrome standard mode, the color material reducing amounts are different among the hues.

As shown in FIG. 12, when the monochrome standard mode is used alone, the color material using amount can be reduced; however, the color material reducing amounts are largely different among the hues, and high image quality may not be obtained. On the other hand, in the fixed coefficient mode, the color material reducing amounts are not greatly different among the hues.

Therefore, an influence of the color material reducing amount on image quality in the fixed coefficient mode has been studied.

Figure 13:
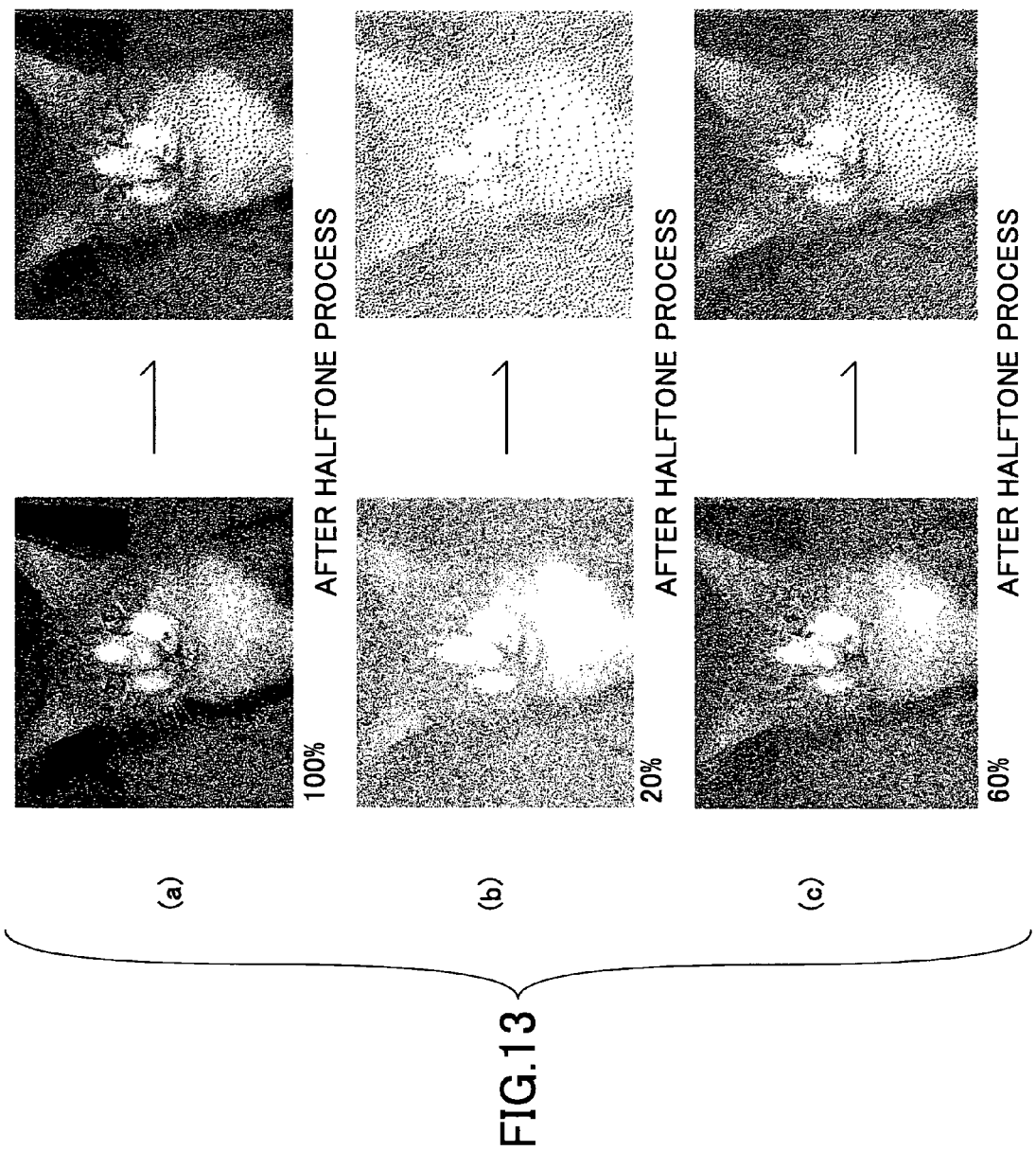
FIG. 13 is a diagram showing output images formed by multiplying with different fixed coefficients for one image according to the embodiment of the present invention.

FIG. 13 is a diagram showing output images formed by multiplying with different fixed coefficients for one image. In FIGS. 13, (a) and (c) are examples in the embodiment of the present invention, and (b) is a comparative example.

In FIG. 13, (a) shows a case where the fixed coefficient=1 (100%), (c) shows a case where the fixed coefficient=0.6 (60%), and (b) shows a case where the fixed coefficient=0.2 (20%). As shown in FIG. 13 (*b*), the output image after the halftone process becomes an image in which only dots are substantially recognized, and the image quality of the output image is remarkably lowered. However, as shown in FIGS. 13 (*a*) and (*c*), when the fixed coefficient is in the range near 0.6 and above 0.2, the output images after the halftone process become images in which images can be recognized even if the image quality is lowered while the fixed coefficient becomes small. That is, the fixed coefficient is preferably in a range from 0.3 to 0.6.

As shown in FIG. 13, in the fixed coefficient mode, the fixed coefficient range to be selected is small; and in order that the image quality substantially equal to in monochrome printing is obtained, when the fixed coefficient is made to be small only in the fixed coefficient mode, the image quality cannot be high. That is, in order not to generate image degradation such as a highlight skip in the halftone process, in the fixed coefficient mode, a higher color material using amount than that in the monochrome standard mode is required. Consequently, a sufficient color material reducing effect is not obtained.

[Color Material Using Amount Reducing mode and Image Quality]

As described above, in each of the color material using amount reducing modes, the color material using amount can be reduced; however, when only one of the color material using amount reducing modes is used, the sufficiently high image quality may not be obtained. In order to obtain a high quality image while the color material using amount is minimized with the color material using amount in the monochrome printing as the reference, the following have been studied.

Figure 14:
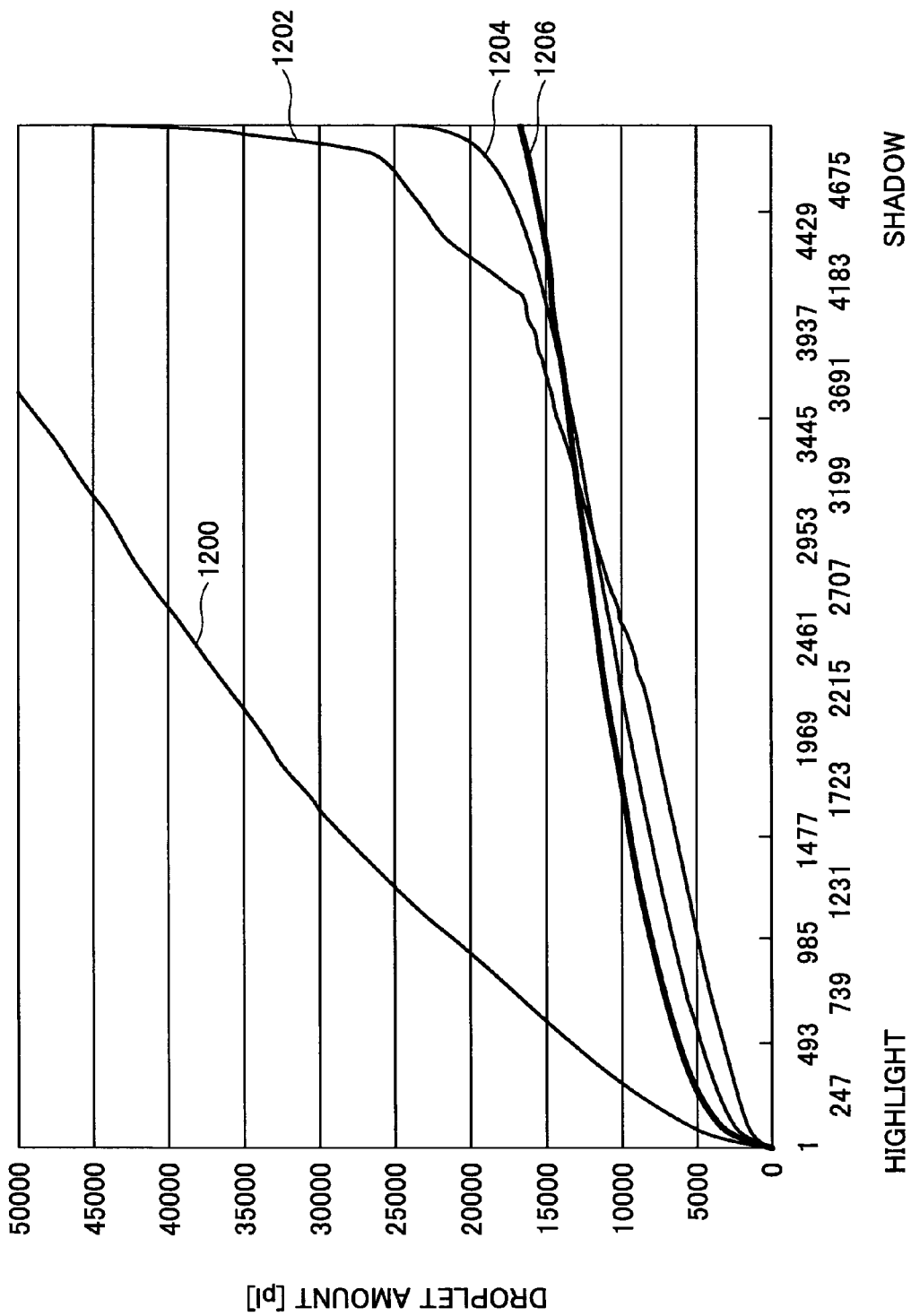
FIG. 14 is a graph showing the color material using amounts in modes according to the embodiment of the present invention.

FIG. 14 is a graph showing the color material using amount. In FIG. 14, the vertical axis shows the color material using amount (droplet amount) and the horizontal axis shows prints on patches in which hue and luminance are different from each other. In the horizontal axis, the patches are arrayed in order of the color material using amount from low to high. That is, the left side corresponds to a highlight color side and the right side corresponds to a shadow color side. In FIG. 14, the same reference number as that shown in FIG. 12 is used. However, the contents of the reference number are different from those shown in FIG. 12. That is, a line 1200 shows the normal mode, a line 1202 shows the monochrome standard mode, a line 1204 shows the fixed coefficient mode whose coefficient is 0.5, and a line 1206 shows the color material using amount reducing mode.

When the psychological effect of an output image of a color print is studied, a color at highlight color side is light and the color material amount to be used is small; when the color material to be used is further decreased, a highlight color may be skipped. On the other hand, at the shadow color side, since the color material using amount is large, the margin to decrease the color material using amount can be likely obtained. In addition, even if the color material using amount is decreased in the shadow color side, this does not directly affect the deformation and the skip of a dot, and the recognition of the output image may not be lowered.

A so-called medium color region connecting the highlight color and the shadow color is a most characterized region in a color image, and as shown in FIG. 13, shading continuity and maintainability of dots of the color image greatly influence the psychological effect of users. In particular, in a business document in addition to image data, light colors having a medium density are frequently used as the background of a table, and in many cases, each of the light colors may have a corresponding individual meaning.

Therefore, maintaining the image dots and contrast in the region from the highlight colors to the medium colors is very important for the psychological effect on users given from the color image. When the contrast is increased while the image dots from the highlight colors to the medium colors are maintained in the color material using amount reducing mode, a bad psychological effect caused by the decrease of the color material using amount can be reduced.

When the contrast from the highlight colors to the medium colors is to be increased, it is preferable that the color material using amount be increased with the color material using amount in the fixed coefficient mode as the reference rather than the color material using amount simply being increased with the color material using amount in the monochrome standard mode as the reference shown in FIGS. 12 and 14. As shown in FIG. 12, in the monochrome standard mode, the decrease of the color material using amount affects not only the tone but also the hue; therefore, for example, the color material using amount in Y is extremely decreased, and scalability of a correction effect cannot be obtained by the image color data.

When multiplication by the fixed coefficient is used, the correction effect can be uniformly applied to each hue. Therefore, a bad influence on the color reproducibility of the medium colors, for example, tone balance being degraded between hues, can be minimized.

In addition, when the fixed coefficient is determined to be 30% to 60%, as shown in FIG. 13, a recognizable image can be obtained. When the fixed coefficient is determined to be 60% or more, in some cases, it may be difficult for the color material using amount to be decreased to the color material using amount of the monochrome standard. The lower limit is not particularly limited when the ability to recognize the image is obtained. However, when the image quality is considered, the fixed coefficient must be determined to be a value so that the color material using amount becomes the amount in the monochrome standard mode or more. Therefore, the range of the fixed coefficient can be obtained by Mathematical Formula (2).

[Mathematical Formula (2)]

$$\text{Value of Color Material Using Amount to be given in Monochrome standard mode or More} < \text{Fixed Coefficient} \leq 0.6 \quad (2)$$

[Switching of Color Material Using Amount]

In order for the color material using amount to be substantially near the amount in the monochrome standard mode while maintaining the image quality, the color material using amount must be a value greater than the amount in the monochrome standard mode in the range between the highlight colors and the medium colors; consequently, the color material using amount at the shadow color side must be decreased. In this case, the color material using amount is decreased at the shadow color side where it exceeds a predetermined threshold value from the color material using amount in the monochrome standard mode. That is, the color material using amount is managed to be switched.

In the embodiment of the present invention, with the monochrome standard mode as the reference, the color material using amount is increased between the highlight colors and the medium colors, and the color material using amount is decreased at the shadow color side so that the color material using amount becomes a nearest amount in the monochrome standard mode.

Figure 15:
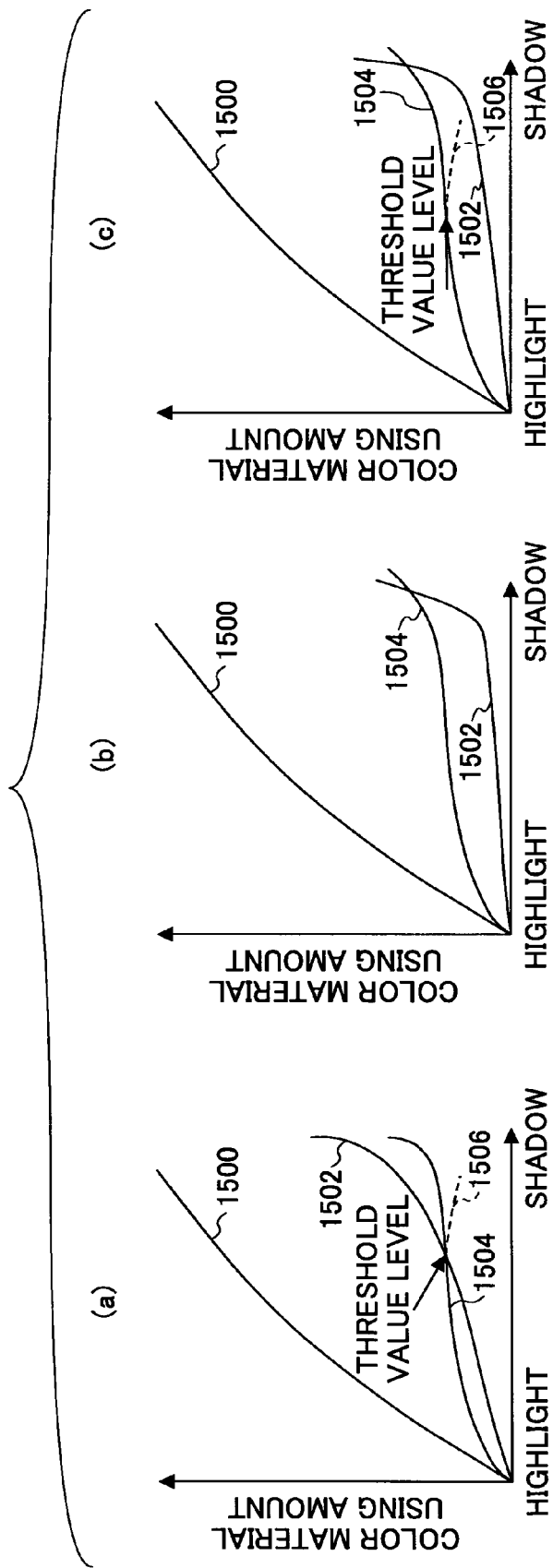
FIG. 15 is a diagram showing a color material using amount reducing process according to the embodiment of the present invention.

FIG. 15 is a diagram showing a color material using amount reducing process according to the embodiment of the present invention. In FIG. 15, a line 1500 shows the color material using amount at a full color image output, a line 1502 shows the color material using amount in the monochrome standard mode, and a line 1504 shows the color material using amount in the fixed coefficient mode.

In the range between the highlight colors and the medium colors in the line 1504 of the fixed coefficient mode shown in FIG. 15(a), the color material using amount is greater than that in the monochrome standard mode; consequently, the image quality is higher than that in the monochrome standard mode in the range. When the fixed coefficient mode is used in the range between the highlight color and the medium colors, the degradation of the image quality can be minimized; however, the color material using amount cannot be sufficiently decreased. Therefore, in the embodiment of the present invention, a switching process is applied to the range between the highlight colors and the medium colors.

Next, the switching process is described. It is assumed that the color material using amounts between the monochrome standard mode and the fixed coefficient mode are different from each other in the hue and the luminance. Therefore, when the second LUT 626 and the third LUT 628 are formed, the presence of the intersection point is determined, or by using a predetermined threshold value, the second LUT 626 is adjusted. In the present embodiment, each of the intersection point and the predetermined threshold value is referred to as a threshold value or a threshold value level. In FIG. 15, a threshold value level is shown by an arrow. In addition, in the present embodiment, the threshold value is determined for the color material using amount; however, the threshold value can be determined for the hue and the input color space coordinate point when the hue relates to the color material using amount. In this case, the threshold value is determined for each hue.

In FIG. 15, (a) shows a case in which the characteristic curve described in FIG. 14 has an intersection point at a position between the highlight colors and the shadow colors, and (b) and (c) show cases in which the intersection point does not exist at a position between the highlight colors and the shadow colors. When the intersection point exists, an interpolation function 1506, which is a smooth curve connecting to the line 1504 of the fixed coefficient mode in the shadow color side by commonly including the intersection point, is formed, and the second LUT 626 is adjusted so that the color material using amount is obtained from the interpolation function 1506.

In addition, when a predetermined threshold value for the color material using amount is used, the interpolation function 1506 is formed from the threshold value of the color material using amount so as to smoothly connect to the line 1504 of the fixed coefficient mode. In any case, the interpolation function 1506 commonly uses the point with the characteristic curve of the fixed coefficient mode and determines coefficients and function type of the interpolation function 1506 and a spline function so that an absolute difference $|C_{Real} - C_{Stand}|$ between an integration value of the color material using amount $C_{Real}$ in the range from the highlight colors to the shadow colors and an integration value $C_{stand}$ of the monochrome standard mode in the range is minimized.

The interpolation function 1506 is determined so that an input color space coordinate value of a sample point in the second LUT 626 are converted into CMY data in which a color difference of the color material using amount given by the interpolation function 1506 is minimized. Then the interpolation function 1506 is used to adjust the second LUT 626 of the monochrome standard mode by using the color material using amount given by the interpolation function 1506. In addition, a threshold value can be determined for an input color space coordinate value or a hue value of HSV or sqrt $\{(a^*)^2 + (b^*)^2\}$.

In addition, it can be determined that the color material reducing process is not applied to a character object and a line art object of color images. This process can be suitably applied when output data are formed by separating raster data from font data. In addition, a different color material reducing process can be applied to the character object and the line art object from a color material reducing process to be applied to raster data. When the contrast of the character object and the line art object is increased by applying the different color material reducing process, the color material reducing effect may be slightly lowered; however, the color material using amount can be reduced in all the image data while maintaining recognition ability of the character object and the line art object.

[Color Material Using Amount Reducing Process]

Figure 16:
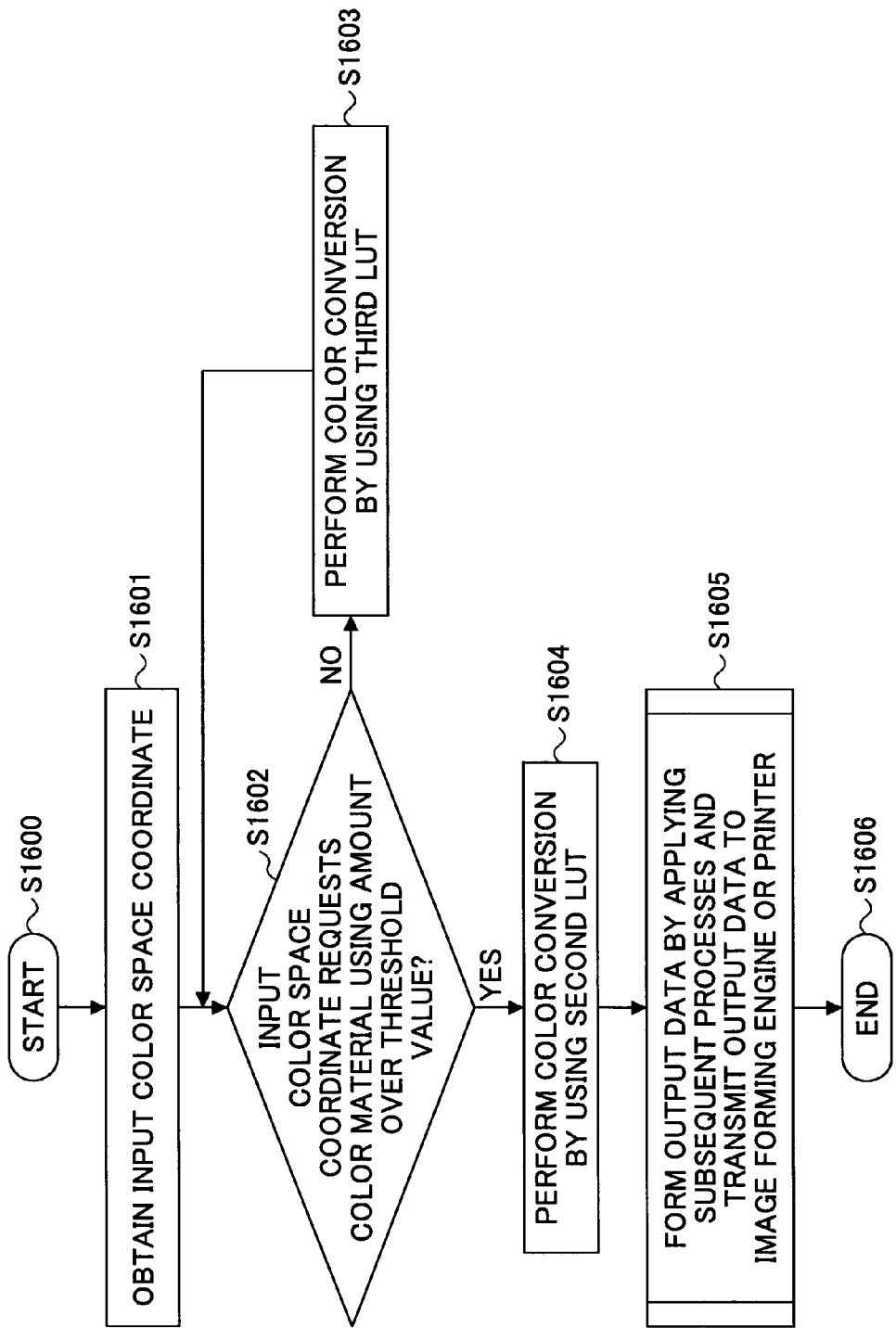
FIG. 16 is a flowchart showing the color material using amount reducing process in a color material using amount reducing mode according to the embodiment of the present invention.

FIG. 16 is a flowchart showing a color material using amount reducing process in a color material using amount reducing mode according to the embodiment of the present invention.

First, an input color space coordinate is obtained (S1601). Next, it is determined whether the input color space coordinate requests a color material using amount greater than a threshold value in the fixed coefficient mode (S1602). The threshold value can be arbitrarily determined by a user, or can be an intersection point between characteristic curves between fixed coefficient mode and the monochrome standard mode when the intersection point exists. When YES in S1602, the color conversion is performed by using the second LUT 626 in which the color material using amount is reduced (S1604). At this stage, in the second LUT 626, data of the monochrome standard mode are not stored, and CMY data corresponding to the color material using amount given by the interpolation function are stored.

When NO in S1602, the color conversion is performed by using the third LUT 628 in which the color material using amount is reduced in the fixed coefficient mode (S1603).

When the color conversion in all the input color space coordinates are completed, the subsequent processes are applied to the image data, output data of the CMY system are formed, and the output data are transmitted to a printer (S1605).

According to the color material using amount reducing process shown in FIG. 16, the output data can be printed by the color material using amount nearest to the monochrome standard mode in the shadow colors while maintaining contrast in the highlight colors, and the tradeoff between the image quality and the color material using amount can be lowered.

Figure 17:
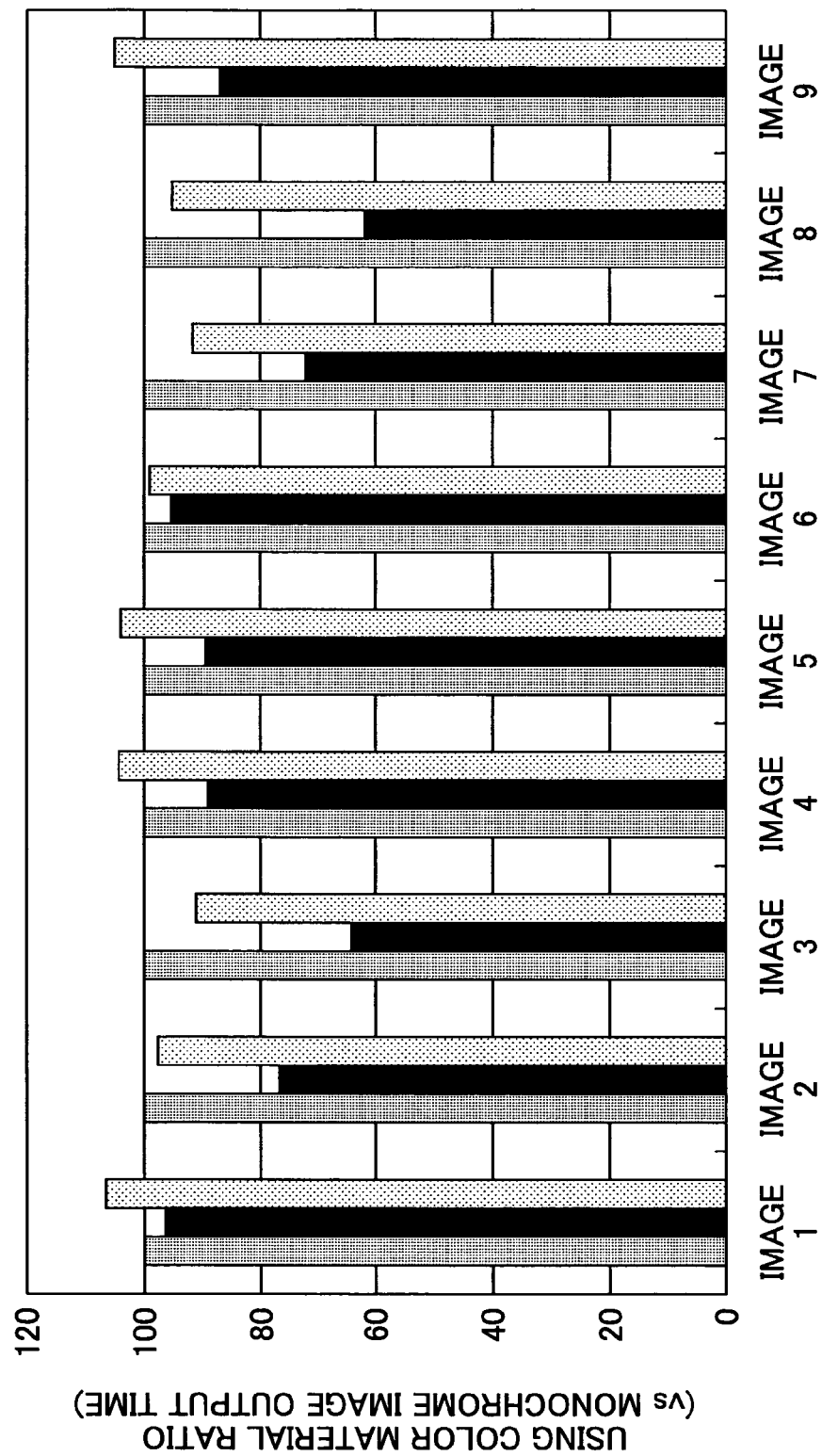
FIG. 17 is a diagram showing the color material using amounts in the color material using amount reducing mode, a fixed coefficient mode, and a monochrome standard mode.

FIG. 17 is a diagram showing the color material using amounts in the color material using amount reducing mode, the fixed coefficient mode, and the monochrome standard mode. In FIG. 17, the color material using amounts are shown with the color material using mount in the monochrome standard mode as the reference in several images. In addition, in FIG. 17, the left side shows the amount in the monochrome standard mode, the center shows the amount in the fixed coefficient mode, and the right side shows the amount in the color material using amount reducing mode.

As shown in FIG. 17, the color material using amounts in the fixed coefficient mode are generally smaller than the amounts in the monochrome standard mode. The reason can be estimated from the following. In the fixed coefficient mode, even if the color material using amount is greater than the amount in the monochrome standard mode in the highlight color side, since a fixed coefficient is multiplied in the shadow color side, the total color material using amount is reduced as a integration value. In addition, in the fixed coefficient mode, in an image 8, the color material using amount is reduced by nearly 40%; therefore, it is understandable that high image quality may not be obtained only in the fixed coefficient mode.

On the other hand, the color material using amount in the color material using amount reducing mode is substantially equal to the amount in the monochrome standard mode in the range ±10%, and substantially the same amount as in the monochrome standard mode can be obtained in the color material using amount reducing mode in the present embodiment.

As shown FIG. 17, when the color material using amount reducing mode in the present embodiment is compared with the cases in which the color material using amount is reduced by using the monochrome standard mode or the fixed coefficient mode, the color material reducing amount is stable; consequently, the color material using amount can be reduced while maintaining original image quality.

In the present embodiment, the color conversion is performed when the fixed coefficient mode is applied from the highlight colors to the medium colors and the monochrome standard mode given by the interpolation function is applied to the shadow colors. In the so-called special colors, it is conceivable that a color reproducibility characteristic exists corresponding to the special colors, and the color conversion can be performed in which the monochrome standard mode is applied to from the highlight colors to the medium colors including hues and luminance and the fixed coefficient mode is applied to the shadow colors, in the special colors including CMYK data.

Figure 18:
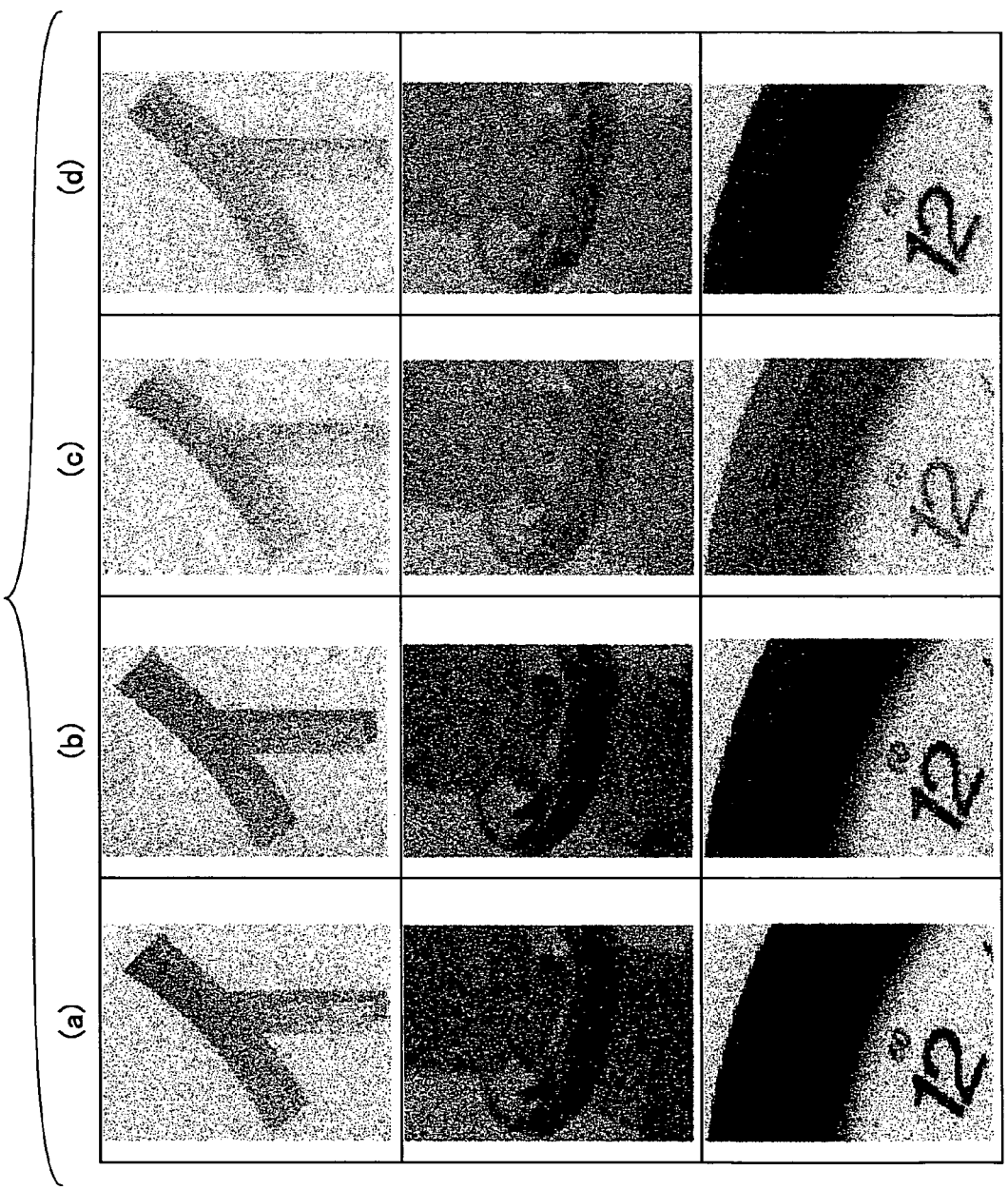
FIG. 18 is a diagram showing printed images by a full color mode, the monochrome standard mode, the fixed coefficient mode, and the color material using amount reducing mode.

FIG. 18 is a diagram showing printed images by a full color mode, the monochrome standard mode, the fixed coefficient mode, and the color material using amount reducing mode in the present invention. In FIG. 18, (a) shows printed images by the full color mode, (b) shows printed images by the monochrome standard mode, (c) shows printed images by the fixed coefficient mode, and (d) shows printed images by the color material using amount reducing mode in the present invention. In FIG. 18(b), color information is does not appear. In FIG. 18(c), the shadow colors become remarkably lighter by a value of the fixed coefficient than in the full color mode.

On the other hand, in the color material using amount reducing mode according to the present invention, as shown in FIG. 18(d), the contrast in the range from the highlight colors to the medium colors is increased, since the color material using amount in the shadow colors can be reduced greater than that in the fixed coefficient mode when compared with the fixed coefficient mode; the color material using amount from the highlight colors to the medium colors can be increased; and the psychological effect of the color material using amount reducing mode becomes substantially near that of the full color mode.

Figure 19:
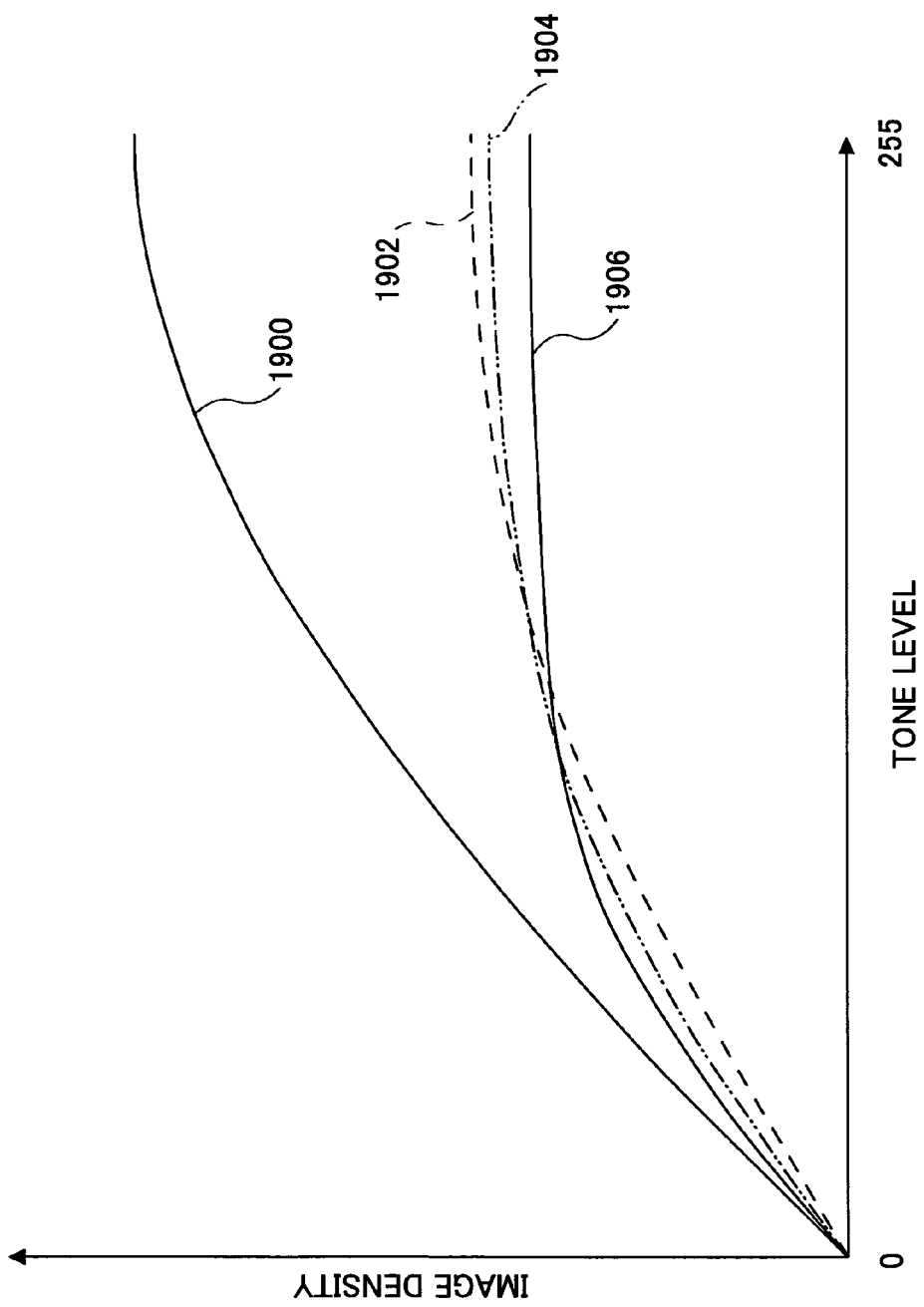
FIG. 19 is a diagram showing tone reproducibility characteristics according to the embodiment of the present invention.

FIG. 19 is a diagram showing tone reproducibility characteristics according to the embodiment of the present invention. In FIG. 19, the vertical axis shows the image density (reflection density) and the horizontal axis shows the tone level, in 8-bit resolution. In FIG. 19, a line 1900 shows the characteristics in the full color mode, a line 1902 shows the characteristic in the monochrome standard mode using NTSC conversion, a line 1904 shows the characteristics in the fixed coefficient mode, and a line 1906 shows the characteristics in the color material using amount reducing mode in the present invention.

As shown in FIG. 19, the image densities in the monochrome standard mode, the fixed coefficient mode, and the color material using amount reducing mode in the present invention are lower than the image density in the full color mode at the same tone level due to the reduction of the color material using amount.

In the fixed coefficient mode shown in the line 1904, in a case where the color material using amount from the highlight colors to the medium colors are caused to be greater than that in the monochrome standard mode, when it is attempted to make the color material using amount be near the amount in the monochrome standard mode by multiplying with the same coefficient for the fixed coefficient mode from the highlight colors to the medium colors, the amount to be applied is restricted, and the contrast to be maintained from the highlight colors to the medium colors is restricted.

On the other hand, in the color material using amount reducing mode in the present embodiment shown in the line 1906, the color material using amount at the shadow side can be reduced by using the interpolation function so that the color material using amount at the range from the highlight colors to the medium colors is increased. Therefore, the total color material using amount from the highlight color side to the shadow color side, that is, the integrated color material using amount, can be almost the same amount as in the monochrome standard mode. In this case, in the range from the highlight colors to the medium colors, the image is formed with higher contrast than in the fixed coefficient mode; therefore, the color image can be approximated to the full color image in the psychological effect.

The color material using amount reducing mode according to the present embodiment can be installed in the ASIC 122 of the image processing apparatus 100. In addition, the color material using amount reducing mode according to the present embodiment can be installed in a printer driver of an information processing apparatus such as a personal computer and a workstation. Further, the color material using amount reducing mode according to the present embodiment can be installed in a CMM conversion process, and can be installed in a hue correction LUT for reducing the color material using amount as a module. When the color material using amount reducing mode is installed in the hue correction LUR as the module, the module can be a preprocess module or a post process module of the BG/UCR process.

In addition, the above processes are applied to a LUT or an image process using a correction function. However, a correction LUT or a correction equation can be executed on the fly in real time when a user inputs a target color material using amount (s %) and a fixed coefficient to be reference from a control panel or a control program. In addition, a fixed coefficient can be selected form predetermined fixed coefficients.

In addition, the LUTs 624, 626, and 628 for reducing the color material using amount, dither patterns for the halftone process, and the interpolation function can be called up from a program as software; or can be stored in a ROM or a RAM corresponding to an image processing speed or CPU throughput. In addition, the above elements can be installed in a recording apparatus which processes from an image process to a print process as a standalone apparatus and in a recording system which processes from the image process to the print process by combining plural devices as application software.

Programs for executing the color material using amount reducing process according to the present invention by using the LUTs and the correction functions are created in a legacy programming language such Assembler or C, or an object oriented programming language such as C++ or JAVA. The programs can be delivered by being installed in a computer-readable storing medium such as a CD-ROM or a DVD. In addition, the programs can be delivered via a network such as the Internet by using a file transfer protocol such as HTTP or FTP.

In addition, the color material using amount reducing process according to the embodiment of the present invention can be applied to an image forming apparatus which uses a recording system such as an electrophotographic system, or a thermal transfer recording system, in addition to the inkjet system.

As described above, according to the embodiment of the present invention, in the color material using amount reducing mode in full color printing, printing cost, including a color material using amount and color material cost, is reduced with user understandable values as a reference; that is, with the color material using amount and the color material cost in the monochrome print mode as the reference. In addition, lowering the psychological effect, such as color invisibility caused by reduction of the color material using amount can be restrained. With this, the reduction of the color material using amount and the prevention of lowering the psychological effect can be achieve.

Further, the present invention is not limited to the embodiment, but various variations and modifications may be made without departing from the scope of the present invention.

The present invention is based on Japanese Priority Patent Application No. 2008-059274 filed on Mar. 10, 2008, with the Japanese Patent Office, the entire contents of which are hereby incorporated herein by reference.

The invention claimed is:

1. An image processing apparatus for color conversion of image data, comprising:
    an application unit which obtains the image data;
    a color conversion unit which obtains at least CMY data from input color space coordinate data of the image data; and
    an output data generating unit which generates output data by forming CMYK data using the CMY data outputted by the color conversion unit;
    wherein the color conversion unit includes:
    an optimum color reproduction data structure which provides at least CMY data to obtain an optimally-color-reproduced full color image based on the input color space coordinate data; and
    a color material using amount reducing data structure which provides at least CMY data to output a full color image for the input color space coordinate data in which a color material using amount lower than a reference value is used, the reference value being a color material using amount for outputting a monochrome image obtained from NTSC conversion of the input color space coordinate data of the image data,
    wherein the color material using amount is increased from the reference value for a first hue of an output image that gives a first psychological effect, and the color material using amount is decreased from the reference value for a second hue of the output image that gives a second psychological effect not as great as the first psychological effect.

2. The image processing apparatus as claimed in claim 1, wherein:
    the image processing apparatus allocates a threshold value to switch characteristics curves to adjust a psychological effect of a hue.

3. The image processing apparatus as claimed in claim 2, wherein:
    the second hue is a hue whose color material using amount is higher than the threshold value, and the first hue is a hue whose color material using amount is lower than the threshold value.

4. The image processing apparatus as claimed in claim 3, wherein:
    the color material using amount reducing data structure is referred to when the color material using amount is determined to be lower than the threshold value or higher than the threshold value, and is referred to when the color material using amount of at least the CMY data is determined to be higher than the reference value, and the color material using amount reducing data structure registers at least the CMY data whose color material using amount is lower than the reference value so that a total color material using amount becomes a predetermined amount away from the reference value.

5. The image processing apparatus as claimed in claim 4, wherein:
    the color material using amount lower than the reference value is given by an interpolation function which changes the color material using amount.

6. An image processing method in an image processing apparatus for color conversion of image data, comprising:
    sending the image data obtained by an application unit of the image processing apparatus to a color conversion unit of the image processing apparatus;
    obtaining at least CMY data from input color space coordinate data of the image data by the color conversion unit; and
    generating output data of CMYK data using the CMY data outputted by the color conversion unit;
    wherein said obtaining at least the CMY data includes:
    determining whether a full color image reproducing mode is selected or a full color image reproduction by a reducing color material using amount mode is selected;
    referring to an optimum color reproducing data structure which provides at least CMY data to obtain an optimally-color-reproduced full color image based on the input color space coordinate data when the full color image optimally reproducing mode is selected; and referring to a color material using amount reducing data structure which provides at least CMY data to output a full color image for the input color space coordinate data in which a color material using amount lower than a reference value is used, the reference value being a color material using amount for outputting a monochrome image obtained from NTSC conversion of the input color space coordinate data of the image data, wherein the color material using amount is increased from the reference value for a first hue of an output image that gives a first psychological effect, and the color material using amount is decreased from the reference value for a second hue of the output image that gives a second psychological effect not as great as the first psychological effect when the full color image reproduction by the reducing color material using amount mode is selected.

7. The image processing method as claimed in claim 6, wherein:

said referring to the color material using amount reducing data structure includes:

changing a threshold value to switch characteristics curves of the color material using amount to adjust a psychological effect of a hue.

8. The image processing method as claimed in claim 7, wherein:

the second hue is a hue whose color material using amount is higher than the threshold value, and the first hue is a hue whose color material using amount is lower than the threshold value.

9. The image processing method as claimed in claim 8, wherein:

the color material using amount reducing data structure is referred to when the color material using amount is determined to be lower than the threshold value or higher than the threshold value, and is referred to when the color material using amount of at least the CMY data is determined to be higher than the reference value, and registers at least the CMY data whose color material using amount is lower than the reference value so that a total color material using amount becomes a predetermined amount away from the reference value.

10. The image processing method as claimed in claim 9, wherein:

the color material using amount lower than the reference value is given by an interpolation function which changes the color material using amount.

11. A non-transitory computer-readable recording medium storing an image processing program in an image processing apparatus which, when the program is executed by a computer, causes the computer to perform a method for color conversion of image data, the method comprising:

sending the image data obtained by an application unit of the image processing apparatus to a color conversion unit of the image processing apparatus;

obtaining at least CMY data from input color space coordinate data of the image data by the color conversion unit; and generating output data of CMYK data using the CMY data outputted by the color conversion unit;

wherein said obtaining at least the CMY data includes:

determining whether a full color image reproducing mode is selected or a full color image reproduction by a reducing color material using amount mode is selected;

referring to a an optimum color reproducing data structure which provides at least CMY data to obtain an optimally-color-reproduced full color image based on the input color space coordinate data when the full color image optimally reproducing mode is selected; and referring to a color material using amount reducing data structure which provides at least CMY data to output a full color image for the input color space coordinate data in which a color material using amount lower than a reference value is used, the reference value being a color material using amount for outputting a monochrome image obtained from NTSC conversion of the input color space coordinate data of the image data, wherein the color material using amount is increased from the reference value for a first hue of an output image that gives a first psychological effect, and the color material using amount is decreased from the reference value for a second hue of the output image that gives a second psychological effect not as great as the first psychological effect when the full color image reproduction by the reducing color material using amount mode is selected.

12. The computer-readable recording medium as claimed in claim 11, wherein:

said referring to the color material using amount reducing data structure includes:

changing a threshold value to switch characteristics curves of the color material using amount to adjust a psychological effect of a hue.

13. The computer-readable recording medium as claimed in claim 12, wherein:

the second hue is a hue whose color material using amount is higher than the threshold value, and the first hue is a hue whose color material using amount is lower than the threshold value.

14. The computer-readable recording medium as claimed in claim 13, wherein:

the color material using amount reducing data structure is referred to when the color material using amount is determined to be lower than the threshold value or higher than the threshold value, and is referred to when the color material using amount of at least the CMY data is determined to be higher than the reference value, and registers at least the CMY data whose color material using amount is lower than the reference value so that a total color material using amount becomes a predetermined amount away from the reference value.

15. The computer-readable recording medium as claimed in claim 14, wherein:

the color material using amount lower than the reference value is given by an interpolation function which changes the color material using amount.

* * * * *